US011963129B2

(12) United States Patent
Cheema et al.

(10) Patent No.: US 11,963,129 B2
(45) Date of Patent: Apr. 16, 2024

(54) SIGNAL ISOLATION USING POLARIZATION IN A NON-TERRESTRIAL NETWORK

(71) Applicant: Lenovo (United States) Inc., Morrisville, NC (US)

(72) Inventors: Sher Ali Cheema, Ilmenau (DE); Majid Ghanbarinejad, Chicago, IL (US); Robin Thomas, Frankfurt am Main (DE)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 103 days.

(21) Appl. No.: 17/554,689

(22) Filed: Dec. 17, 2021

(65) Prior Publication Data

US 2023/0199701 A1 Jun. 22, 2023

(51) Int. Cl.
*H04W 64/00* (2009.01)
*H04L 5/00* (2006.01)
*H04L 5/04* (2006.01)

(52) U.S. Cl.
CPC ......... *H04W 64/003* (2013.01); *H04L 5/0005* (2013.01); *H04L 5/0048* (2013.01); *H04L 5/04* (2013.01)

(58) Field of Classification Search
CPC .. H04W 64/003; H04W 64/00; H04L 5/0005; H04L 5/0048; H04L 5/04; H04L 5/005; H04L 5/0094; H04B 7/18545; G01S 5/021
See application file for complete search history.

(56) References Cited

U.S. PATENT DOCUMENTS

| 2008/0177430 A1 | 7/2008 | Tekawy et al. |
| 2013/0257648 A1 | 10/2013 | Garin et al. |
| 2014/0292564 A1 | 10/2014 | Park et al. |
| 2015/0018010 A1 | 1/2015 | Fischer |

(Continued)

FOREIGN PATENT DOCUMENTS

| WO | 2013181264 A1 | 12/2013 |
| WO | 2021155578 A1 | 8/2021 |

OTHER PUBLICATIONS

Guidotti, A., et al., "Architectures, standardisation, and procedures for 5G Satellite Communications: A survey", Computer Networks, vol. 183 [retrieved Feb. 3, 2023]. Retrieved from the Internet <https://doi.org/10.1016/j.comnet.2020.107588>, Dec. 24, 2020, 18 pages.

(Continued)

*Primary Examiner* — Kabir A Timory
(74) *Attorney, Agent, or Firm* — FIG. 1 Patents

(57) ABSTRACT

Various aspects of the present disclosure relate to a UE that receives a first configuration associated with a set of positioning reference signals, where the first configuration indicates a time and frequency resource for a positioning reference signal of the set of positioning reference signals. The UE also receives a second configuration that associates a positioning measurement of the positioning reference signal on the time and frequency resource, and receives one or more types of polarization associated with the first configuration and/or the second configuration. The UE also transmits a report indicating the one or more types of polarization associated with the positioning measurement of the positioning reference signal on the time and frequency resource.

20 Claims, 16 Drawing Sheets

(56) References Cited

U.S. PATENT DOCUMENTS

| | | |
|---|---|---|
| 2015/0382318 A1 | 12/2015 | Kim et al. |
| 2018/0048444 A1* | 2/2018 | Park .................... H04J 11/0079 |
| 2021/0144539 A1 | 5/2021 | Edge et al. |
| 2021/0239783 A1* | 8/2021 | Calcev .................... G01S 11/08 |
| 2021/0306869 A1 | 9/2021 | Wei et al. |
| 2022/0408497 A1 | 12/2022 | Matsuda et al. |
| 2023/0194649 A1 | 6/2023 | Thomas et al. |
| 2023/0199685 A1 | 6/2023 | Ghanbarinejad et al. |
| 2023/0199694 A1 | 6/2023 | Ghanbarinejad et al. |

OTHER PUBLICATIONS

Lenovo, Motorola Mobility, "Positioning Latency Reduction Enhancements", 3GPP TSG RAN WG2 Meeting#115-e, R2-2108127 [retrieved May 3, 2023]. Retrieved from the Internet <https://www.3gpp.org/ftp/tsg_ran/WG2_RL2/TSGR2_115-e/Docs>., Aug. 2021, 11 Pages.

PCT/IB2022/062251, "International Search Report and Written Opinion", PCT Application No. PCT/ B2022/062251, dated Mar. 3, 2023, 12 pages.

PCT/IB2022/062257, "International Search Report and Written Opinion", PCT Application No. PCT/ B2022/062257, dated Mar. 13, 2023, 16 pages.

PCT/IB2022/062333, "International Search Report and Written Opinion", PCT Application No. PCT/ B2022/062333, dated Mar. 16, 2023, 6 pages.

PCT/IB2022/062336, "International Search Report and Written Opinion", PCT Application No. PCT/ B2022/062336, dated May 9, 2023, 16 pages.

ZTE, et al., "Discussion on positioning latency reduction", 3GPP TSG-RAN WG2 Meeting #116 electronic, R2-2109460, Online [retrieved May 3, 2023]. Retrieved from the Internet <https://www.3gpp.org/ftp/tsg_ran/WG2_RL2/TSGR2_116-e/Docs>., Nov. 2021, 6 Pages.

ZTE Corporation, et al., "Consideration on system information and cell (re)selection in NTN", 3GPP TSG-RAN WG2 Meeting#111, R2-2006872, Electronic [retrieved Mar. 16, 2023]. Retrieved from the Internet <https://www.3gpp.org/ftp/tsg_ran/WG2_RL2/TSGR2_111-e/Docs>, Aug. 2020, 6 pages.

"5G System (5GS) Location Services (LCS)", 3rd Generation Partnership Project; Technical Specification Group Services and System Aspects, 3GPP TS 23.273 V17.2.0, 3GPP Organizational Partners, Valbonne, France [retrieved Feb. 2, 2022]. Retrieved from the Internet <http://www.3gpp.org>., Sep. 2021, 99 pages.

"Evolved Universal Terrestrial Radio Access (E-UTRA): Physical channels and modulation", 3rd Generation Partnership Project, Technical Specification Group Radio Access Network, 3GPP TS 36.211 V16.7.0, 3GPP Organizational Partners, Valbonne, France [retrieved Feb. 2, 2022]. Retrieved from the Internet <http://www.3gpp.org>., Sep. 2021, 249 pages.

"LTE Positioning Protocol (LPP)", 3rd Generation Partnership Project, Technical Specification Group Radio Access Network, 3GPP TS 37.355 V16.4.0, 3GPP Organizational Partners, Valbonne, France [retrieved Feb. 2, 2022]. Retrieved from the Internet <http://www.3gpp.org>., Mar. 2021, 298 pages.

"LTE Positioning Protocol (LPP)", 3rd Generation Partnership Project, Technical Specification Group Radio Access Network, 3GPP TS 37.355 V16.6.0, 3GPP Organizational Partners, Valbonne, France [retrieved Feb. 2, 2022]. Retrieved from the Internet <http://www.3gpp.org>., Sep. 2021, 299 pages.

"NG Radio Access Network (NG-RAN): Stage 2 functional specification of User Equipment (UE) positioning in NG-RAN", 3rd Generation Partnership Project, Technical Specification Group Radio Access Network, 3GPP TS 38.305 V16.6.0, 3GPP Organizational Partners, Valbonne, France [retrieved Feb. 2, 2022]. Retrieved from the Internet <http://www.3gpp.org>., Sep. 2021, 120 pages.

"NG-RAN: Architecture description", 3rd Generation Partnership Project, Technical Specification Group Radio Access Network, 3GPP TS 38.401 V16.7.0, 3GPP Organizational Partners, Valbonne, France [retrieved Feb. 2, 2022]. Retrieved from the Internet <http://www.3gpp.org>., Oct. 2021, 79 pages.

"NG-RAN: NR Positioning Protocol A (NRPPa)", 3rd Generation Partnership Project, Technical Specification Group Radio Access Network, 3GPP TS 38.455 V16.5.0, 3GPP Organizational Partners, Valbonne, France [retrieved Feb. 2, 2022]. Retrieved from the Internet <http://www.3gpp.org>., Oct. 2021, 152 pages.

"NR: Physical layer measurements", 3rd Generation Partnership Project, Technical Specification Group Radio Access Network, 3GPP TS 38.215 V16.3.0, 3GPP Organizational Partners, Valbonne, France [retrieved Feb. 2, 2022]. Retrieved from the Internet <http://www.3gpp.org>., Sep. 2020, 25 pages.

"Procedures for the 5G System (5GS)", 3rd Generation Partnership Project, Technical Specification Group Services and System Aspects, 3GPP TS 23.502 V17.2.1, 3GPP Organizational Partners, Valbonne, France [retrieved Feb. 2, 2022]. Retrieved from the Internet <http://www.3gpp.org>., Sep. 2021, 712 pages.

"System architecture for the 5G System (5GS)", 3rd Generation Partnership Project; Technical Specification Group Services and System Aspects, 3GPP TS 23.501 V17.2.0, 3GPP Organizational Partners, Valbonne, France [retrieved Feb. 2, 2022]. Retrieved from the Internet <http://www.3gpp.org>., Sep. 2021, 542 pages.

Cheema, Sher et al., "U.S. Application as Filed", U.S. Appl. No. 63/121,475, filed Dec. 4, 2020, 42 pages.

Ghanbarinejad, Majid et al., "U.S. Application as Filed", U.S. Appl. No. 17/554,916, filed Dec. 17, 2021, 79 pages.

Ghanbarinejad, Majid et al., "U.S. Application as Filed", U.S. Appl. No. 17/555,164, filed Dec. 17, 2021, 87 pages.

Thomas, Robin et al., "U.S. Application as Filed", U.S. Appl. No. 17/554,583, filed Dec. 17, 2021, 80 pages.

U.S. Appl. No. 17/555,164, "Notice of Allowance", U.S. Appl. No. 17/555,164, Feb. 14, 2024, 8 pages.

* cited by examiner

```
-- ASN1START

NR-DL-TDOA-ProvideAssistanceData-r16 ::= SEQUENCE {
    nr-DL-PRS-AssistanceData-r16           NR-DL-PRS-AssistanceData-r16           OPTIONAL,  -- Need ON
    nr-SelectedDL-PRS-IndexList-r16        NR-SelectedDL-PRS-IndexList-r16        OPTIONAL,  -- Need ON
    nr-PositionCalculationAssistance-r16
                                           NR-PositionCalculationAssistance-r16
                                                                                  OPTIONAL,  -- Cond UEB
    nr-DL-TDOA-Error-r16                   NR-DL-TDOA-Error-r16                   OPTIONAL,  -- Need ON
    ...
}
-- ASN1STOP
```

FIG. 3 — 300

```
-- ASN1START

NR-DL-TDOA-SignalMeasurementInformation-r16 ::= SEQUENCE {
    dl-PRS-ReferenceInfo-r16         DL-PRS-IdInfo-r16,
    nr-DL-TDOA-MeasList-r16          NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                    INTEGER (0..255),
    nr-PhysCellID-r16                NR-PhysCellID-r16                OPTIONAL,
    nr-CellGlobalID-r16              NCGI-r15                         OPTIONAL,
    nr-ARFCN-r16                     ARFCN-ValueNR-r15                OPTIONAL,
    nr-DL-PRS-ResourceId-r16         NR-DL-PRS-ResourceId-r16         OPTIONAL,
    nr-DL-PRS-ResourceSetId-r16      NR-DL-PRS-ResourceSetId-r16      OPTIONAL,
    nr-TimeStamp-r16                 NR-TimeStamp-r16,
    nr-RSTD-r16                      CHOICE {
        k0-r16                           INTEGER (0..1970049),
        k1-r16                           INTEGER (0..985025),
        k2-r16                           INTEGER (0..492513),
        k3-r16                           INTEGER (0..246257),
        k4-r16                           INTEGER (0..123129),
        k5-r16                           INTEGER (0..61565),
    },
    nr-AdditionalPathList-r16        NR-AdditionalPathList-r16        OPTIONAL,
    nr-TimingQuality-r16             NR-TimingQuality-r16,
    nr-DL-PRS-RSRP-Result-r16        INTEGER (0..126)                 OPTIONAL,
    nr-DL-TDOA-AdditionalMeasurements-r16
                                     NR-DL-TDOA-AdditionalMeasurements-r16
                                                                      OPTIONAL,
    ...
}

NR-DL-TDOA-AdditionalMeasurements-r16 ::= SEQUENCE (SIZE (1..3)) OF
                                     NR-DL-TDOA-AdditionalMeasurementElement-r16

NR-DL-TDOA-AdditionalMeasurementElement-r16 ::= SEQUENCE {
    nr-DL-PRS-ResourceId-r16         NR-DL-PRS-ResourceId-r16         OPTIONAL,
    nr-DL-PRS-ResourceSetId-r16      NR-DL-PRS-ResourceSetId-r16      OPTIONAL,
    nr-TimeStamp-r16                 NR-TimeStamp-r16,
    nr-RSTD-ResultDiff-r16           CHOICE {
        k0-r16                           INTEGER (0..8191),
        k1-r16                           INTEGER (0..4095),
        k2-r16                           INTEGER (0..2047),
        k3-r16                           INTEGER (0..1023),
        k4-r16                           INTEGER (0..511),
        k5-r16                           INTEGER (0..255),
    },
    nr-TimingQuality-r16             NR-TimingQuality-r16,
    nr-DL-PRS-RSRP-ResultDiff-r16    INTEGER (0..61)                  OPTIONAL,
    nr-AdditionalPathList-r16        NR-AdditionalPathList-r16        OPTIONAL,
    ...
}
-- ASN1STOP
```

FIG. 4 — 400

```
...
DL-PRS-QCL-Info-r16 ::= CHOICE {
    ssb-r16                       SEQUENCE {
        pci-r16                       NR-PhysCellID-r16,
        ssb-Index-r16                 INTEGER (0..63),
        rs-Type-r16                   ENUMERATED {typeC, typeD, typeE, typeC-plus-typeD, typeC-
                                      plus-typeE, typeD-plus-typeE } 
    },
    dl-PRS-r16                    SEQUENCE {
        qcl-DL-PRS-ResourceSetID-r16     NR-DL-PRS-ResourceSetID-r16,
        qcl-DL-PRS-ResourceSetID-RC-r16  NR-DL-PRS-ResourceSetID-RC-r16
        qcl-DL-PRS-ResourceSetID-LC-r16  NR-DL-PRS-ResourceSetID-LC-r16
    }
}
...
```

— 1802    FIG. 18    — 1804, 1806, 1800

```
-- ASN1START

NR-DL-PRS-AssistanceData-r16 ::= SEQUENCE {
    nr-DL-PRS-ReferenceInfo-r16       DL-PRS-ID-Info-r16,
    nr-DL-PRS-AssistanceDataList-r16  SEQUENCE (SIZE (1..nrMaxFreqLayers-r16)) OF
                                          NR-DL-PRS-AssistanceDataPerFreq-r16,
    nr-SSB-Config-r16                 SEQUENCE (SIZE (1..nrMaxTRPs-r16)) OF
                                          NR-SSB-Config-r16    OPTIONAL,  -- Need ON
    ...
}

NR-DL-PRS-AssistanceDataPerFreq-r16 ::= SEQUENCE {
    nr-DL-PRS-PositioningFrequencyLayer-r16
                                      NR-DL-PRS-PositioningFrequencyLayer-r16,
    nr-DL-PRS-AssistanceDataPerFreq-r16 SEQUENCE (SIZE (1..nrMaxTRPsPerFreq-r16)) OF
                                          NR-DL-PRS-AssistanceDataPerTRP-r16,
    ...
}

NR-DL-PRS-AssistanceDataPerTRP-r16 ::= SEQUENCE {
    dl-PRS-ID-r16                     INTEGER (0..255),
    nr-PhysCellID-r16                 NR-PhysCellID-r16         OPTIONAL,  -- Need ON
    nr-DL-PRS-CellID-r16              BIT STRING (SIZE(2))      OPTIONAL,  -- Need ON
    nr-CellGlobalID-r16               NCGI-r15                  OPTIONAL,  -- Need ON
    nr-ARFCN-r16                      ARFCN-ValueNR-r15         OPTIONAL,  -- Need ON
    nr-DL-PRS-SFN0-Offset-r16         NR-DL-PRS-SFN0-Offset-r16,
    nr-DL-PRS-ExpectedRSTD-r16        INTEGER (-3841..3841),
    nr-DL-PRS-ExpectedRSTD-Uncertainty-r16
                                      INTEGER (0..246),
    nr-DL-PRS-Info-r16                NR-DL-PRS-Info-r16,
    ...,
    [[
        prs-OnlyTP-r16                ENUMERATED { true }       OPTIONAL,  -- Need ON
    ]]
}

NR-DL-PRS-PositioningFrequencyLayer-r16 ::= SEQUENCE {
    dl-PRS-SubcarrierSpacing-r16      ENUMERATED {kHz15, kHz30, kHz60, kHz120, ...},
    dl-PRS-ResourceBandwidth-r16      INTEGER (1..63),
    dl-PRS-StartPRB-r16               INTEGER (0..2176),
    dl-PRS-PointA-r16                 ARFCN-ValueNR-r15,
    dl-PRS-CombSizeN-r16              ENUMERATED {n2, n4, n6, n12, ...},
    dl-PRS-CyclicPrefix-r16           ENUMERATED {normal, extended, ...},
    ...
}

NR-DL-PRS-SFN0-Offset-r16 ::= SEQUENCE {
    sfn-Offset-r16                    INTEGER (0..1023),
    integerSubframeOffset-r16         INTEGER (0..9),
    ...
}

-- ASN1STOP
```

— 1902    FIG. 19    — 1904, 1900

```
-- ASN1START

DL-PRS-ID-Info-r16 ::= SEQUENCE {
    dl-PRS-ID-r16                   INTEGER (0..255),
    dl-PRS-Pol-r16                  BIT STRING (SIZE(2)|ENUMERATED {..}),
    nr-DL-PRS-ResourceID-List-r16   SEQUENCE (SIZE (1..nrMaxResourceIDs-r16)) OF
                                        NR-DL-PRS-ResourceID-r16
                                                                            OPTIONAL, -- Need ON
    nr-DL-PRS-ResourceSetID-r16     NR-DL-PRS-ResourceSetID-r16
                                                                            OPTIONAL, -- Need ON
}

-- ASN1STOP
```

FIG. 20 — 2000, 2002, 2004

```
-- ASN1START

NR-DL-TDOA-SignalMeasurementInformation-r16 ::= SEQUENCE {
    dl-PRS-ReferenceInfo-r16        DL-PRS-ID-Info-r16,
    nr-DL-TDOA-MeasList-r16         NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                   INTEGER (0..255),
    dl-PRS-Pol-r16                  BIT STRING (SIZE(2)|ENUMERATED {..}),
    nr-PhysCellID-r16               NR-PhysCellID-r16                       OPTIONAL,
    nr-CellGlobalID-r16             NCGI-r15                                OPTIONAL,
    nr-ARFCN-r16                    ARFCN-ValueNR-r15                       OPTIONAL,
    nr-DL-PRS-ResourceID-r16        NR-DL-PRS-ResourceID-r16                OPTIONAL,
    nr-DL-PRS-ResourceSetID-r16     NR-DL-PRS-ResourceSetID-r16             OPTIONAL,
    nr-TimeStamp-r16                NR-TimeStamp-r16,
    nr-RSTD-r16                     CHOICE {
        k0-r16                          INTEGER (0..1970049),
        k1-r16                          INTEGER (0..985025),
        k2-r16                          INTEGER (0..492513),
        k3-r16                          INTEGER (0..246257),
        k4-r16                          INTEGER (0..123129),
        k5-r16                          INTEGER (0..61565),
        ...
    },
    nr-AdditionalPathList-r16       NR-AdditionalPathList-r16               OPTIONAL,
    nr-TimingQuality-r16            NR-TimingQuality-r16,
    nr-DL-PRS-RSRP-Result-r16       INTEGER (0..126)                        OPTIONAL,
    nr-DL-TDOA-AdditionalMeasurements-r16
                                    NR-DL-TDOA-AdditionalMeasurements-r16   OPTIONAL,
    ...
}

NR-DL-TDOA-AdditionalMeasurements-r16 ::= SEQUENCE (SIZE (1..3)) OF
                                        NR-DL-TDOA-AdditionalMeasurementElement-r16

NR-DL-TDOA-AdditionalMeasurementElement-r16 ::= SEQUENCE {
    nr-DL-PRS-ResourceID-r16        NR-DL-PRS-ResourceID-r16                OPTIONAL,
    nr-DL-PRS-ResourceSetID-r16     NR-DL-PRS-ResourceSetID-r16             OPTIONAL,
    nr-TimeStamp-r16                NR-TimeStamp-r16,
    nr-RSTD-ResultDiff-r16          CHOICE {
        k0-r16                          INTEGER (0..8191),
        k1-r16                          INTEGER (0..4095),
        k2-r16                          INTEGER (0..2047),
        k3-r16                          INTEGER (0..1023),
        k4-r16                          INTEGER (0..511),
        k5-r16                          INTEGER (0..255),
        ...
    },
    nr-TimingQuality-r16            NR-TimingQuality-r16,
    nr-DL-PRS-RSRP-ResultDiff-r16   INTEGER (0..61)                         OPTIONAL,
    nr-AdditionalPathList-r16       NR-AdditionalPathList-r16               OPTIONAL,
    ...
}

-- ASN1STOP
```

FIG. 21 — 2100, 2102, 2104

SIGNAL ISOLATION USING POLARIZATION IN A NON-TERRESTRIAL NETWORK

TECHNICAL FIELD

The present disclosure relates to wireless communications, and more specifically to signal isolation using polarization in a non-terrestrial network (NTN).

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G.

In some cases, a wireless communications system may be an NTN, which may support various communication devices to support wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances. In a positioning system for an NTN, one or more location servers, or components of the location servers, may communicate with one or multiple UEs connected to the NTN over a wireless medium. In some cases, in an NTN, propagation delays can be orders of magnitude longer than those in a typical terrestrial network (TN). Additionally, satellites or any other non-terrestrial transmit-receive points (NT-TRPs) may be moving at high speeds, for example in the case of low-earth orbit (LEO) and medium-earth orbit (MEO) satellite systems. Other non-terrestrial systems, such as geosynchronous satellite systems, may also introduce wireless communication challenges due to NT-TRP movements.

SUMMARY

The present disclosure relates to methods, apparatuses, and systems that enable a communication device (e.g., a UE, a base station, a network entity) to perform measurement of reference signals (such as, positioning reference signals (PRS)) and reporting of positioning information of the communication device in an NTN. For example, the communication device may be configured with a PRS configuration, and the communication device may perform PRS measurement and reporting of positioning information according to RAT-dependent positioning operations in an NTN. In some implementations, the communication device may receive the PRS configuration from a location server configured with a location management function (LMF). The PRS configuration may include one or more parameters for supporting accurate measurement and reporting of positioning information of the communication device in a low-latency manner, accounting for moving TRPs, higher Doppler shift, and long propagation delays in the NTN.

By supporting measurement and reporting according to RAT-dependent positioning operations in an NTN, a communication device may verify its location and perform optimized low-latency radio positioning. For example, a communication device, such as UE in wireless communication with a satellite in an NTN may report location using onboard devices, which needs to be verified by the network using RAT-dependent positioning methods. Additionally, by supporting measurement and reporting according to RAT-dependent positioning operations in an NTN, a communication device may experience improved NTN positioning in rural and remote areas, where cellular TRPs are otherwise rare, intermittent, or non-existent. Additionally, the satellites in LEO and MEO systems travel on predictable trajectories and at high speeds, causing a significant Doppler effect in signals received on the ground, which may also be taken into account for positioning enhancements.

In aspects of the disclosure, the circular polarization beam types can be used with NTN positioning reference signals to increase the overall system capacity, which improves communication reliability and the accuracy of positioning measurements. For example, circular polarization beam types that are orthogonal to each other can be used to configure and isolate different positioning reference signals (PRSs), thus avoiding interference between adjacent serving cells. In different aspects, circular polarization beam types can be configured and associated with positioning reference signals (PRSs) to isolate PRS tones, such as at the serving cell level, the TRP, for a resource set, or at a resource level. Multiple polarization beam types that are configured and associated with a single beam can be transmitted from the same an NTN node to enhance PRS coverage. Additionally, UE measurement reports can be polarization based, and configured for common or specific positioning methods.

Some implementations of the method and apparatuses described herein may further include network signaling and/or wireless communication at an apparatus (e.g., device, UE), and the apparatus receives a first configuration associated with a set of PRSs, where the first configuration indicates a time and frequency resource for a PRS of the set of PRSs. The apparatus also receives a second configuration that associates a positioning measurement of the PRS on the time and frequency resource, and receives one or more types of polarization associated with the first configuration and/or the second configuration. The apparatus can then transmit a report indicating the one or more types of polarization associated with the positioning measurement of the PRS on the time and frequency resource.

Some implementations of the method and apparatuses described herein may further include network signaling and/or wireless communication at an apparatus (e.g., device, location server), and the apparatus transmits a first configuration associated with a set of PRSs, where the first configuration indicates a time and frequency resource for a PRS of the set of PRSs. The apparatus can also transmit a second configuration associating a positioning measurement of the PRS on the time and frequency resource, and transmits one or more types of polarization associated with the first configuration and/or the second configuration. The apparatus can then receive a report indicating the one or more types of polarization associated with the positioning measurement of the PRS on the time and frequency resource.

BRIEF DESCRIPTION OF THE DRAWINGS

Various aspects of the present disclosure for signal isolation using polarization in an NTN are described with reference to the following Figures. The same numbers may be used throughout to reference like features and components shown in the Figures.

FIG. 3 illustrates an example of assistance data configuration with respect to UE measurement and report configuration signaling, adaptable for signal isolation using polarization in an NTN in accordance with aspects of the present disclosure.

FIG. 4 illustrates an example of a positioning measurement report with respect to UE measurement and report configuration signaling, adaptable for signal isolation using polarization in an NTN in accordance with aspects of the present disclosure.

FIG. 18 illustrates another example of an information element (IE) with a quasi co-location (QCL) type used to indicate an association between downlink source reference signals and target reference signals in terms of a polarization type, as related to signal isolation using polarization in an NTN in accordance with aspects of the present disclosure.

FIG. 19 illustrates another example of an information element (IE) with a PRS-AssistanceData that designates a polarization type, as related to signal isolation using polarization in an NTN in accordance with aspects of the present disclosure.

FIG. 20 illustrates another example of an information element (IE) with an indication of the polarization type for specific PRS beam ID, as related to signal isolation using polarization in an NTN in accordance with aspects of the present disclosure.

FIG. 21 illustrates another example of an information element (IE) with a measurement report that indicates the polarization type, as related to signal isolation using polarization in an NTN in accordance with aspects of the present disclosure.

DETAILED DESCRIPTION

Figure 1:
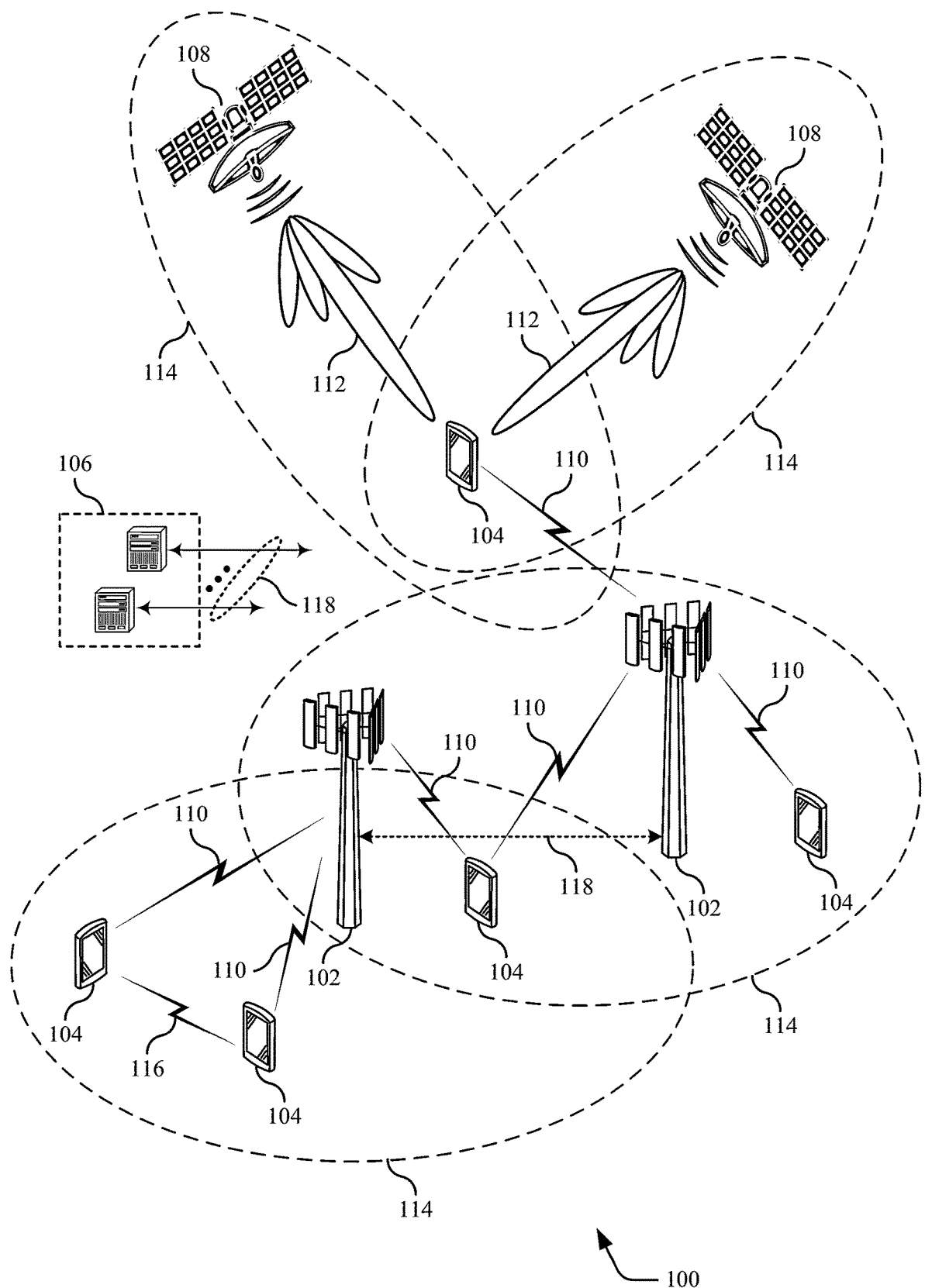
FIG. 1 illustrates an example of a wireless communications system that supports signal isolation using polarization in an NTN in accordance with aspects of the present disclosure.

Implementations of signal isolation using polarization in an NTN are described, such as related to PRS configuration, measurement, processing, and reporting utilizing RAT-dependent positioning for UE connected to an NTN. The configuration signaling parameters from a location server that implements a LMF are adapted to facilitate a target UE being able to report accurate positioning measurements in a low-latency manner, taking into consideration the moving TRPs, higher Doppler shift, and long propagation delays. The present disclosure provides configuration, reporting, and signaling enhancements to support the RAT-dependent positioning procedures over an NTN using 3GPP NR technology and radio access node (RAN) functionality that supports signaling procedures to enable the RAT NR positioning.

An NTN can include satellites and gateway entities transmitting and receiving over long distances with location servers and UE connected to the NTN for wireless communications. Notably, the moving TRPs, higher Doppler shift, and long propagation delays add levels of complexity to enable wireless communications utilizing NG-RAN technology in an NTN. Procedures for PRS configuration, measurement, processing, and reporting are lacking for NTN entities, such as for satellites and gateway network entities in the third-generation partnership project (3GPP) positioning architecture. Further, regulatory and emergency services requirements need to be addressed, so that configured PRS resources and reported positioning measurements are conveyed to a target UE in a timely manner, particularly given the round trip time (RTT) delays experienced in an NTN. For effective network-based signal isolation using polarization in an NTN, a location server that implements a LMF needs to receive the measurement report and location estimates from a UE in a low-latency manner which introduces a challenge, given the extended propagation times over which the positioning reports and estimates are communicated in an NTN.

The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilize different and/or additional positioning data than for TN positioning, such as ephemeris data related to satellite movements and satellite architecture information, such as an architecture based on a regenerative payload architecture (RPA) model or a transparent payload architecture (TPA) model. For typical TN positioning, the LMF does not need the NT-TRP-related configuration information for a positioning process for a UE, given that TRPs are capable of positioning at network nodes with gNBs (base stations) that are typically static (e.g., non-moving), and their signal strength, communication capabilities, behaviors, etc. are more predictable. Whereas, in an NTN, the LMF may not have sufficient node information to configure signaling, particularly when a signaling failure may occur as the number of satellites in communication range changes dynamically.

In an NTN, inter-beam interference can degrade system performance due to the large footprint size of transmission beams, and thus have large corresponding beam overlapping areas. Even narrow transmission beams generated at a satellite will have a large footprint over the long distances by which the NTN entities communicate. In aspects of the disclosure for signal isolation using polarization in an NTN, circular polarization types can be used in an NTN to mitigate interference, thus improving link budget. Specifically, higher frequency reuse and the use of circular polarization types, such as left hand circular polarized (LHCP) and right hand circular polarized (RHCP), adds a dimensionality to generate orthogonal signals while improving the efficiency of frequency usage.

In aspects of the disclosure, the circular polarization beam types can be used with NTN positioning reference signals to increase the overall system capacity, which improves communication reliability and the accuracy of positioning measurements. For example, circular polarization beam types that are orthogonal to each other can be used to configure and isolate different positioning reference signals (PRSs), thus avoiding interference between adjacent serving cells. In different aspects, circular polarization beam types can be configured and associated with positioning reference signals (PRSs) to isolate PRS tones, such as at the serving cell level, the TRP, for a resource set, or at a resource level. Multiple polarization beam types that are configured and associated with a single beam can be transmitted from the same an NTN node to enhance PRS coverage. Additionally, UE measurement reports can be polarization based, and configured for common or specific positioning methods.

Aspects of the present disclosure include configuration, adaptation, and/or enhancements of NG-RAN signaling in an NTN. The enhanced signaling can take into account any type of NTN entity and the associated configuration information for the entity. As described herein, an NTN entity may also be referred to as any type of non-terrestrial station (NTS), which may be any type of TRPs, which may be onboard geostationary and/or geosynchronous (GEO) satellites, MeO satellites, LEO satellites, high-altitude platform systems (HAPS), unmanned aerial vehicles (UAV), aircraft, or any other vehicle travelling in the earth's atmosphere, orbiting in outer space, and similar type entities. Any entity referred to as a NTS in the present disclosure may be referring to a satellite, satellite access node, network node, NG-RAN node, non-terrestrial transmission-reception point (NT-TRP), NTN TP, NTN RP, and the like.

Aspects of the present disclosure are described in the context of a wireless communications system. Aspects of the present disclosure are further illustrated and described with reference to device diagrams and flowcharts that relate to signal isolation using polarization in an NTN.

FIG. 1 illustrates an example of a wireless communications system 100 that supports signal isolation using polarization in an NTN in accordance with aspects of the present disclosure. The wireless communications system 100 may include one or more base stations 102, one or more UEs 104, a core network 106, and one or more NTSs 108, such as satellite access nodes. The wireless communications system 100 may support various radio access technologies. In some implementations, the wireless communications system 100 may be a 4G network, such as a LTE network or an LTE-A network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNB, a gNB, or other suitable terminology. A base station 102 and a UE 104 may communicate via a communication link 110, which may be a wireless or wired connection. For example, a base station 102 and a UE 104 may perform wireless communication over a NR-Uu interface. The one or more NTSs 108 described herein may be or include any type of TRPs (which may be onboard geostationary and/or geosynchronous satellites), MEO satellites, LEO satellites, HAPS, UAV, aircraft, or any other vehicle travelling in the earth's atmosphere, orbiting in outer space, and the like. Any entity referred to as a non-terrestrial station (NTS) in the present disclosure may be referring to a satellite, a satellite access node, NTN node, NG-RAN node, NT-TRP, NTN TP, NTN RP, and similar type entities. A NTS 108 and a UE 104 may communicate via a communication link 112, which may be a wireless connection via a transmission beam and/or a reception beam.

A base station 102 and/or a NTS 108 may provide a geographic coverage area 114 for which the base station 102 and/or NTS 108 may support services (e.g., voice, video, packet data, messaging, broadcast, etc.) for one or more UE 104 within the geographic coverage area. For example, a base station 102 and a UE 104 may support wireless communication of signals related to services (e.g., voice, video, packet data, messaging, broadcast, etc.) according to one or multiple radio access technologies. Similarly, a NTS 108 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite associated with an NTN. In some implementations, different geographic coverage areas 114 associated with the same or different radio access technologies may overlap, and different geographic coverage areas 114 may be associated with different base stations 102 and/or with different NTSs 108. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 114 of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100, such as a very small aperture terminal (VSAT), which may be connected to one or multiple other network nodes serving other UEs. In some other implementations, a UE 104 may be mobile in the wireless communications system 100, such as an earth station in motion (ESIM).

The one or more UEs 104 may be devices in different forms or having different capabilities. A UE 104 may be capable of communicating with various types of devices, such as the base stations 102, other UEs 104, NTSs 108, or network equipment (e.g., the core network 106, a relay device, a gateway device, an integrated access and backhaul (IAB) node, a location server that implements the LMF, or other network equipment). Additionally, or alternatively, a UE 104 may support communication with other base stations 102 or UE 104, which may act as relays in the wireless communications system 100.

A UE 104 may also support wireless communication directly with other UE 104 over a communication link 116. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 116 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 118 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 and/or NTSs 108 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as a radio heads, smart radio heads, gateways, TRPs, and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

In at least one implementation, one or more of the UEs 104, the base stations 102, and/or one or more of the NTSs 108 are operable to implement various aspects of signal isolation using polarization in an NTN as described herein. For instance, leveraging the described techniques, a UE 104 is operable to communicate with a NTS 108 to facilitate wireless communications. The positioning processes in an NTN take into account several different considerations than those for typical TN positioning, such as the longer propagation delays, moving satellites in the case of LEO and/or MeO satellite systems, larger pathloss, uncertainty about the number of satellites in range at any particular moment, and so on. The positioning processes in an NTN also utilizes different and/or additional positioning data than for TN positioning.

In aspects of the disclosure, circular polarization beam types (e.g., left hand circular polarized (LHCP) and right hand circular polarized (RHCP)) can be used with NTN positioning reference signals to increase the overall system capacity, and improve communication reliability and the accuracy of positioning measurements. For example, circular polarization beam types that are orthogonal to each other can be used to configure and isolate different positioning reference signals (PRSs), thus avoiding interference between adjacent serving cells. The signaling procedures (techniques) include association and configuration of a polarization type with positioning reference signals (PRSs) to isolate PRS tones at the cell, TRP, resource set, or resource level. The signaling procedures (techniques) also include configuration of multiple polarizations that are associated with a single beam, and are transmitted from the same node to enhance PRS coverage. The signaling procedures (techniques) also include configuration of polarization-based UE measurement reports common or specific to positioning methods.

With reference to terrestrial networks (TNs), the 3GPP (release 17) defines the positioning performance requirements. For example, the positioning error requirement for end-to-end latency for a position estimate of a UE in a commercial use case is less than 100 ms, and in an IIoT use case is less than 100 ms, within the order of 10 ms being desired. However, these positioning performance requirements do not take into account the latency experienced in an NTN, and do not address obtaining a position estimate for a UE given the extended propagation delays, such as for signaling and communications between a UE and a NTS (e.g., a satellite).

In aspects of signal isolation using polarization in an NTN, various RAT-dependent positioning techniques (also referred to as positioning methods, or positioning procedures) are supported for UE; for UE assisted, LMF-based; and/or for NG-RAN node assisted. Additionally, various RAT-independent positioning techniques, such as network-assisted global navigation satellite system (GNSS) methods, may also be utilized separately or in combination with the described RAT-dependent positioning techniques to determine the location of a UE. The RAT-dependent positioning techniques that are supported include downlink-time difference of arrival (DL-TDOA), downlink-angle of departure (DL-AoD), multi-round trip time (multi-RTT), new radio enhanced cell-ID (NR E-CID); uplink-time difference of arrival (UL-TDOA); and uplink-angle of arrival (UL-AoA).

The DL-TDOA positioning technique utilizes at least three network nodes for positioning based on triangulation. The DL-TDOA positioning method makes use of the downlink reference signal time difference (RSTD) (and optionally DL PRS RSRP) of downlink signals received from multiple transmission points (TPs) at the UE. The UE measures the downlink RSTD (and optionally DL PRS RSRP) of the received signals using assistance data received from the positioning server (also referred to herein as the location server), and the resulting measurements are used along with other configuration information to locate the UE in relation to the neighboring TPs. In terms of 2D localization, three or more network nodes are required, while in the case of 3D location estimation, four or more network nodes are desirable, where nodes are TPs.

The DL-AoD positioning technique makes use of the measured DL PRS RSRP of downlink signals received from multiple TPs at the UE. The UE measures the DL PRS RSRP of the received signals using assistance data received from the positioning server (also referred to herein as the location server), and the resulting measurements are used along with other configuration information to locate the UE in relation to the neighboring TPs. The location estimate accuracy of the DL-AoD technique will also improve for N≥1 nodes.

The multi-RTT positioning technique makes use of the UE Rx-Tx measurements and DL PRS RSRP of downlink signals received from multiple TRPs, as measured by the UE and the measured gNB Rx-Tx measurements and uplink sounding reference signal (SRS) RSRP (UL SRS-RSRP) at multiple TRPs of uplink signals transmitted from UE. The UE measures the UE Rx-Tx measurements (and optionally DL PRS RSRP of the received signals) using assistance data received from the positioning server (also referred to herein as the location server), and the TRPs the gNB Rx-Tx measurements (and optionally UL SRS-RSRP of the received signals) using assistance data received from the positioning server. The measurements are used to determine the RTT at the positioning server, which are used to estimate the location of the UE. The location estimate accuracy of the multi-RTT positioning technique will also improve for N≥1 nodes.

For the NR E-CID positioning technique, the position of a UE is estimated with the knowledge of its serving next generation evolved NodeB (ng-eNB), gNB and cell, and is based on LTE signals. The information about the serving next generation evolved NodeB (ng-eNB), gNB and cell may be obtained by paging, registration, or other methods. The NR enhanced cell-ID (NR E-CID) positioning refers to techniques which use additional UE measurements and/or NR radio resources and other measurements to improve the UE location estimate using NR signals. Although enhanced cell-ID (E-CID) positioning may utilize some of the same measurements as the measurement control system in the radio resource control (RRC) protocol, the UE may not make additional measurements for the sole purpose of positioning (i.e., the positioning procedures do not supply a measurement configuration or measurement control message, and the UE reports the measurements that it has available rather than being required to take additional measurement actions).

The UL-TDOA positioning technique makes use of the uplink time difference of arrival (UL-TDOA) (and optionally UL SRS-RSRP) at multiple reception points (RPs) of uplink signals transmitted from UE. The RPs measure the UL-TDOA (and optionally UL SRS-RSRP) of the received signals using assistance data received from the positioning server, and the resulting measurements are used along with other configuration information to estimate the location of the UE. The location estimate accuracy of the UL-TDOA technique will also improve for N≥3 nodes.

The UL-AoA positioning technique makes use of the measured azimuth and the zenith of arrival at multiple RPs of uplink signals transmitted from UE. The RPs measure azimuth-AoA and zenith-AoA of the received signals using assistance data received from the positioning server (also referred to herein as the location server), and the resulting measurements are used along with other configuration information to estimate the location of the UE. The location estimate accuracy of the UL-AoA technique will also improve for N≥1 nodes.

Figure 2:
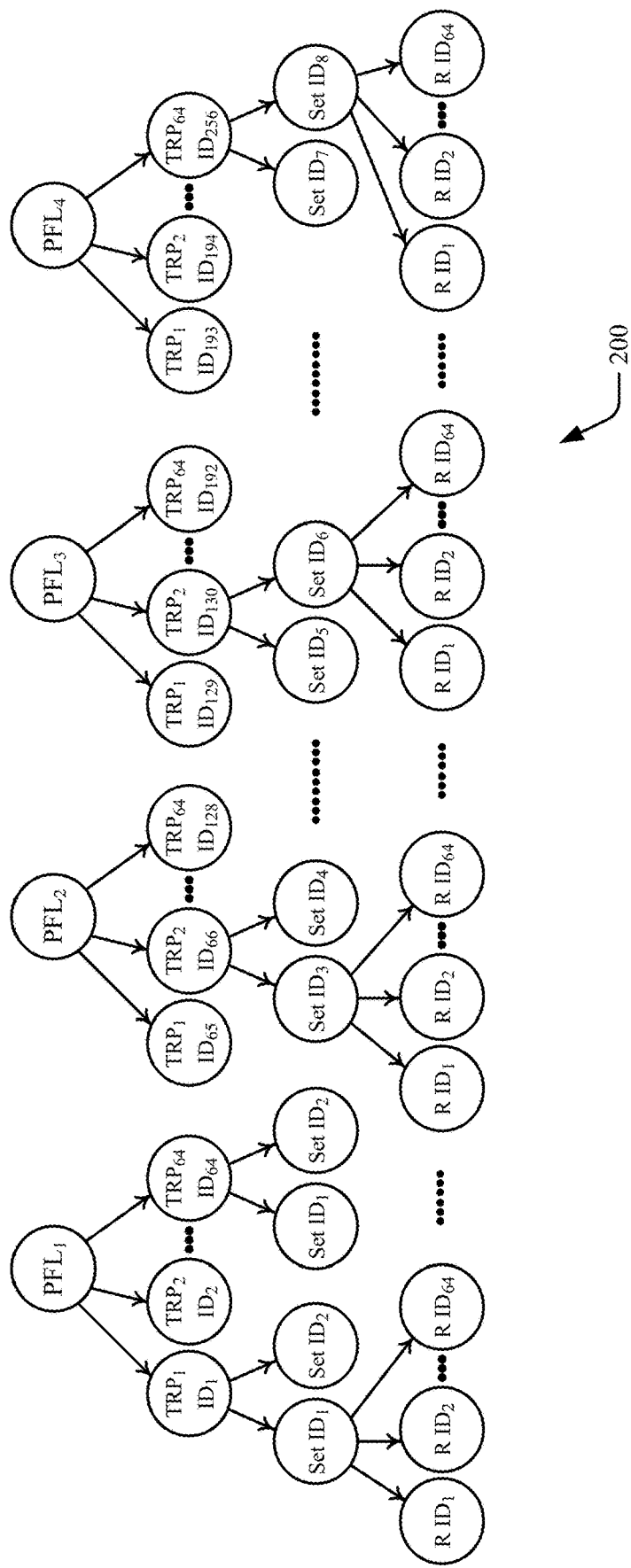
FIG. 2 illustrates an example of PRS configuration levels as related to signal isolation using polarization in an NTN in accordance with aspects of the present disclosure.

FIG. 2 illustrates an example 200 of PRS configuration levels as related to signal isolation using polarization in an NTN in accordance with aspects of the present disclosure. The configuration levels can include at the cell level (e.g., PFL level), at the TRP level, at the resource set level, and/or for each beam associated with a resource.

With regard to positioning measurements and reference signals, a PRS that is transmitted on the downlink from a NTS can be locally associated with a PRS resource ID and resource set ID for a base station (e.g., TRP). Similarly, UE positioning measurements, such as RSTD and PRS RSRP measurements are made between beams (e.g., between a different pair of downlink positioning reference signal (DL PRS) resources or DL PRS resource sets) as opposed to different cells, as was the case in LTE. There are additional uplink positioning methods that a network can utilize to compute the location of a target UE. Tables T1 and T2 show the reference signal to measurements mapping for each of the supported RAT-dependent positioning techniques at the UE and gNB, respectively.

TABLE T1

UE measurements to enable RAT-dependent positioning techniques.

| DL/UL Reference Signals | UE Measurements | To facilitate support of the positioning techniques |
|---|---|---|
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/ Rel. 16 SRS for positioning | UE Rx-Tx time difference | Multi-RTT |
| Rel. 15 SSB/ CSI-RS for RRM | SS-RSRP (RSRP for RRM), SS-RSRQ (for RRM), CSI-RSRP (for RRM), CSI-RSRQ (for RRM), SS-RSRPB (for RRM) | NR E-CID |

TABLE T2 gNB measurements to enable RAT-dependent positioning techniques.

| DL/UL Reference Signals | gNB Measurements | To facilitate support of the positioning techniques |
|---|---|---|
| Rel. 16 SRS for positioning | UL RTOA | UL-TDOA |
| Rel. 16 SRS for positioning | UL SRS-REFERENCE SIGNAL RECEIVED POWER (RSRP) | UL-TDOA, UL-AoA, Multi-RTT |
| Rel. 16 SRS for positioning, Rel. 16 DL PRS | gNB Rx-Tx time difference | Multi-RTT |
| Rel. 16 SRS for positioning | AoA and ZoA | UL-AoA, Multi-RTT |

The RAT-dependent positioning techniques can utilize the 3GPP RAT and core network entities to perform the position estimation of the UE, which are differentiated from RAT-independent positioning techniques, which rely on GNSS, IMU sensor, WLAN, and Bluetooth technologies for performing target device (UE) positioning. These aspects of NR downlink-based positioning are applicable, and can be extended and adapted for an NTN gNB. For example, the location server that implements the LMF is typically a component of the core network, but in aspects of the described disclosure, may be implemented with the gNB onboard a NTS, such as a satellite. In this implementation, positioning of the UE may be determined faster than if the LMF is ground-based at the core network.

FIG. 3 illustrates an example 300 of assistance data configuration (current implementation Rel-16), with respect to UE measurement and report configuration signaling applicable to downlink-based positioning techniques. In the DL-TDOA assistance data, the information element (IE) NR-DL-TDOA-ProvideAssistanceData 302 is used by the location server to provide assistance data to enable UE-assisted and UE-based NR DL-TDOA, and may also be used to provide a NR DL-TDOA positioning specific error reason.

FIG. 4 illustrates an example 400 of measurement information (current implementation Rel-16), with respect to UE measurement and report configuration signaling applicable to downlink-based positioning techniques. In the DL-TDOA measurement report, the information element (IE) NR-DL-TDOA-SignalMeasurementlnformation 402 is used by the target UE to provide NR DL-TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target UE selects a reference resource per the TRP, and compiles the measurements per the TRP based on the selected reference resource.

The different downlink measurements, including DL PRS RSRP, downlink RSTD, and UE Rx-Tx time difference required for the supported RAT-dependent positioning techniques are shown in Table T3. The measurement configurations may include four (4) pair of downlink RSTD measurements performed per pair of cells, and each measurement is performed between a different pair of downlink PRS resources or resource sets with a single reference timing; and eight (8) downlink PRS reference signal received power (RSRP) (DL PRS-RSRP) measurements can be performed on different downlink PRS resources from the same cell.

TABLE T3

Downlink measurements for downlink-based positioning techniques.

| | DL PRS RSRP |
|---|---|
| Definition | DL PRS RSRP, is the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |
| | DL reference signal time difference (DL RSTD) |
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |
| | UE Rx – Tx time difference |
| Definition | The UE Rx – Tx time difference is defined as $T_{UE-RX} - T_{UE-TX}$ Where: $T_{UE-RX}$ is the UE received timing of downlink subframe #i from a positioning node, defined by the first detected path in time. $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ |

TABLE T3-continued

Downlink measurements for downlink-based positioning techniques.

| | |
|---|---|
| | measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency<br>RRC_CONNECTED inter-frequency |

Figure 5:
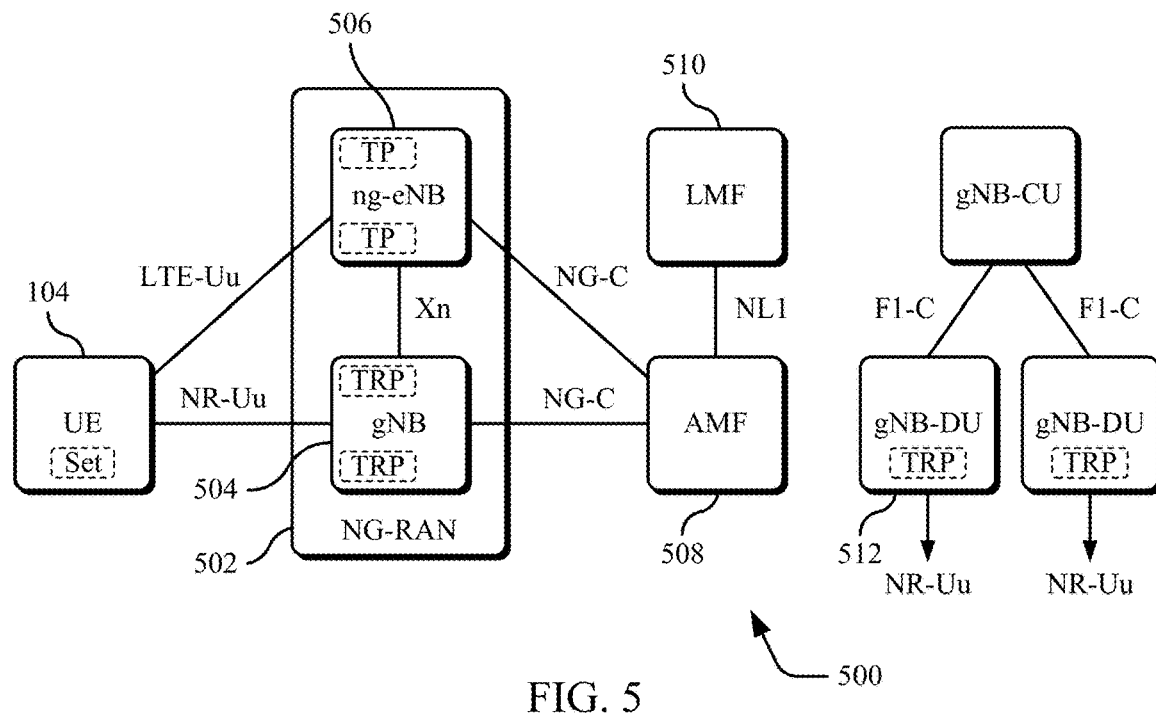
FIG. 5 illustrates an example network architecture applicable to next generation radio access network (NG-RAN) for UE positioning as related to signal isolation using polarization in an NTN in accordance with aspects of the present disclosure.

FIG. 5 illustrates an example architecture 500 applicable to NG-RAN 502 for UE positioning. The NG-RAN 502 is capable of supporting both types of interfaces LTE-Uu and NR-Uu, and the gNB 504 may be implemented in an NTN architecture. The gNB 504 and an LTE next generation evolved NodeB (ng-eNB) 506 are connected by a Xn backhaul interface. The access and mobility management function (AMF) 508 may be transparent, or bypassed in an NTN architecture, and the LMF 510 provides the positioning techniques and configuration for UE positioning.

The AMF 508 may receive a request for some location service associated with a particular target UE 104 from another entity (e.g., a gateway mobile location center (GMLC) or UE), or the AMF itself decides to initiate some location service on behalf of a particular target UE, such as for an IP multimedia subsystem (IMS) emergency call from the UE. The AMF 508 then sends a location services request to the LMF 510. The LMF 510 processes the location services request which may include transferring assistance data to the target UE 104 to assist with UE-based and/or UE-assisted positioning and/or may include positioning of the target UE. The LMF 510 then returns the result of the location service back to the AMF 508 (e.g., a position estimate for the UE 104). In the case of a location service requested by an entity other than the AMF (e.g., requested by a GMLC or UE), the AMF 508 returns the location service result to this entity.

An NG-RAN node may control several TRPs and/or TPs, such as remote radio heads, or downlink PRS-only TPs for support of PRS-based terrestrial beacon system (TBS). A LMF 510 may have a proprietary signaling connection to an enhanced serving mobile location center (E-SMLC), which may enable the LMF 510 to access information from an evolved universal terrestrial radio access network (E-UTRAN) (e.g. to support the observed time difference of arrival (OTDOA) for a E-UTRA positioning method using downlink measurements obtained by a target UE of signals from next generation evolved NodeBs (ng-eNBs) and/or PRS-only TPs in E-UTRAN). A LMF 510 may have a proprietary signaling connection to a SUPL location platform (SLP). The SUPL location platform (SLP) is the secure user plane location (SUPL) entity responsible for positioning over the user plane. In the case of a split gNB architecture, a gNB-DU 512 may include TRP functionality, where the TRP functionality may support functions for a TP, RP, or both. A gNB-DU 512 that includes TRP functionality does not need to offer cell services. To support positioning of a target UE and delivery of location assistance data to a UE with NG-RAN access in SGS, location related functions are distributed as shown in the example architecture 400.

Figure 6:
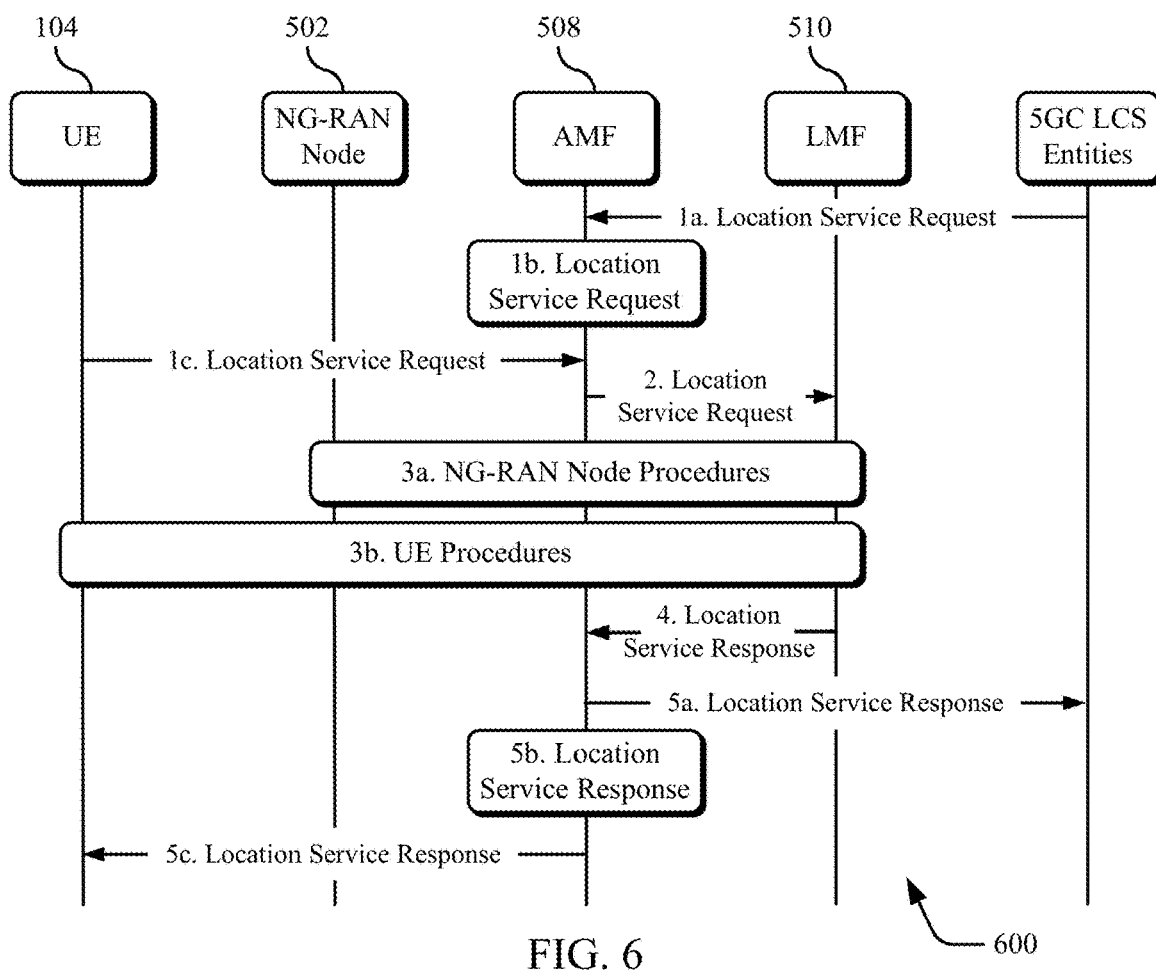
FIG. 6 illustrates an example signaling sequence applicable to NG-RAN for UE positioning as related to signal isolation using polarization in an NTN in accordance with aspects of the present disclosure.

FIG. 6 illustrates an overall sequence 600 of signaling events applicable to the UE 104, the NG-RAN 502, the AMF 508, and the LMF 510 for any location service. When the AMF 508 receives a location service request (LSR), and the UE 104 is in a connection management (CM)-idle state (CM-IDLE) state, the AMF 508 performs a network triggered service request in order to establish a signaling connection with the UE and assigns a specific serving gNB or next generation evolved NodeB (ng-eNB). The UE is assumed to be in a connected mode before the beginning of the signaling shown in the figure (i.e., signaling that may be needed to bring the UE to the connected mode prior to step 1a is not shown). However, the signaling connection may be later released, such as by the NG-RAN 502 node as a result of signaling and data inactivity while positioning is still ongoing. Additionally, the NG-RAN 502 node represents any combination of NTSs in an NTN, including a network architecture with a TN and NTN gNB, and/or a network architecture that is fully an NTN with NG-RAN architecture.

At step 1, either step 1a, step 1b, or step 1c is performed. At step 1a, an entity in the 5GC, such as a GMLC, requests a location service for positioning a target UE 104 to the serving AMF 508. Alternatively at step 1b, the serving AMF 508 for the target UE 104 determines the need for a location service (e.g. to locate the UE for an emergency call). Alternatively at step 1c, the UE 104 requests a location service, such as for the positioning or delivery of assistance data, to the serving AMF 508 at the non-access-stratum (NAS) level.

At step 2, the AMF 508 transfers the location service request to the LMF 510. At step 3a, the LMF 510 instigates location procedures with the serving and possibly neighboring next generation evolved NodeB (ng-eNB) or gNB in the NG-RAN 502, such as to obtain positioning measurements or assistance data. In addition to step 3a or alternatively (instead of step 3a), at step 3b, the LMF 510 instigates location procedures with the UE 104, such as to obtain a location estimate or positioning measurements, or to transfer location assistance data to the UE.

At step 4, the LMF 510 provides a location service response to the AMF 508 and includes any needed results, such as a success or failure indication and, if requested and obtained, a location estimate for the UE 104. At step 5a (if step 1a was performed), the AMF 508 returns a location service response to the 5GC entity in step 1a and includes any needed results, such as a location estimate for the UE 104. At step 5b (if step 1b occurred), the AMF 508 uses the location service response received in step 4 to assist the service that triggered this in step 1b, such as to provide a location estimate associated with an emergency call to a GMLC. At step 5c (if step 1c was performed), the AMF 508 returns a location service response to the UE 104 and includes any needed results, such as a location estimate for the UE.

In aspects of signal isolation using polarization in an NTN, the location procedures applicable to NG-RAN occur in steps 3a and 3b, which supports the configurations and reporting for communication between the LMF 510 and the UE 104 to enable an NTN level positioning. The steps 3a and 3b may involve the use of different positioning methods (also referred to herein as positioning techniques or positioning procedures) to obtain location related measurements for a target UE, and from these, the UE computes a location estimate and additional positioning assistance information.

Figure 7:
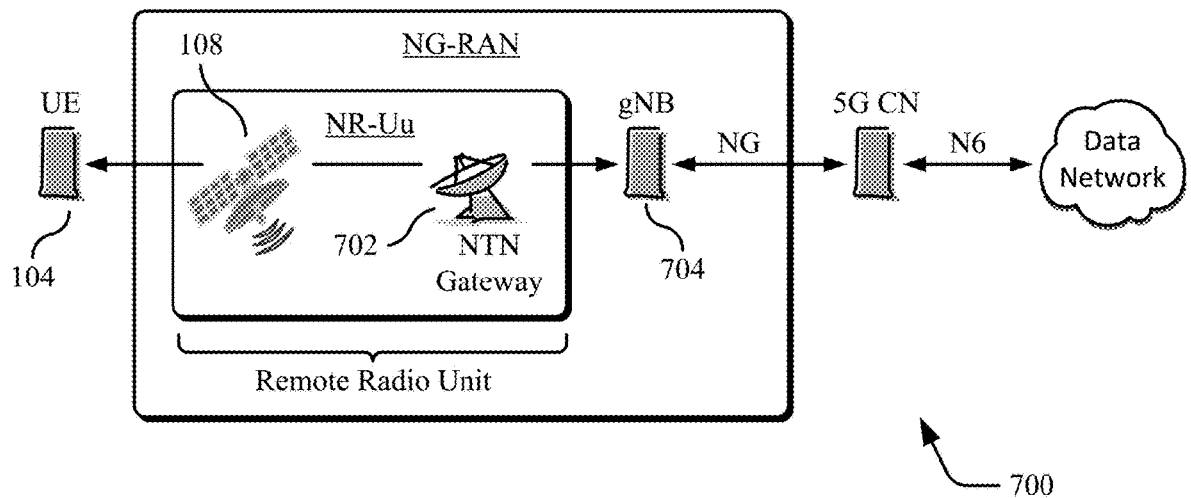
FIG. 7 illustrates an example transparent satellite-based NG-RAN architecture that supports signal isolation using polarization in an NTN in accordance with aspects of the present disclosure.

FIG. 7 illustrates a transparent satellite-based NG-RAN architecture 700. The satellite payload implements frequency conversion and a radio frequency amplifier in both the uplink and downlink directions, and it corresponds to an analogue RF repeater. Hence, the satellite (e.g., a NTS 108) repeats the NR-Uu radio interface from the feeder link, between the NTN gateway 702 and the satellite, to the service link between the satellite and the UE 104 (and vice-versa). The satellite radio interface (SRI) on the feeder link is the NR-Uu, meaning that the satellite does not terminate the NR-Uu radio interface. The NTN gateway 702 may support all of the necessary functions to forward the signal of the NR-Uu interface, and different transparent satellites may be connected to the same gNB 704 on the ground. Note that while several gNBs may access a single satellite payload, the illustration and description is simplified to the one gNB 704 accessing the satellite payload, without loss of generality.

Figure 8:
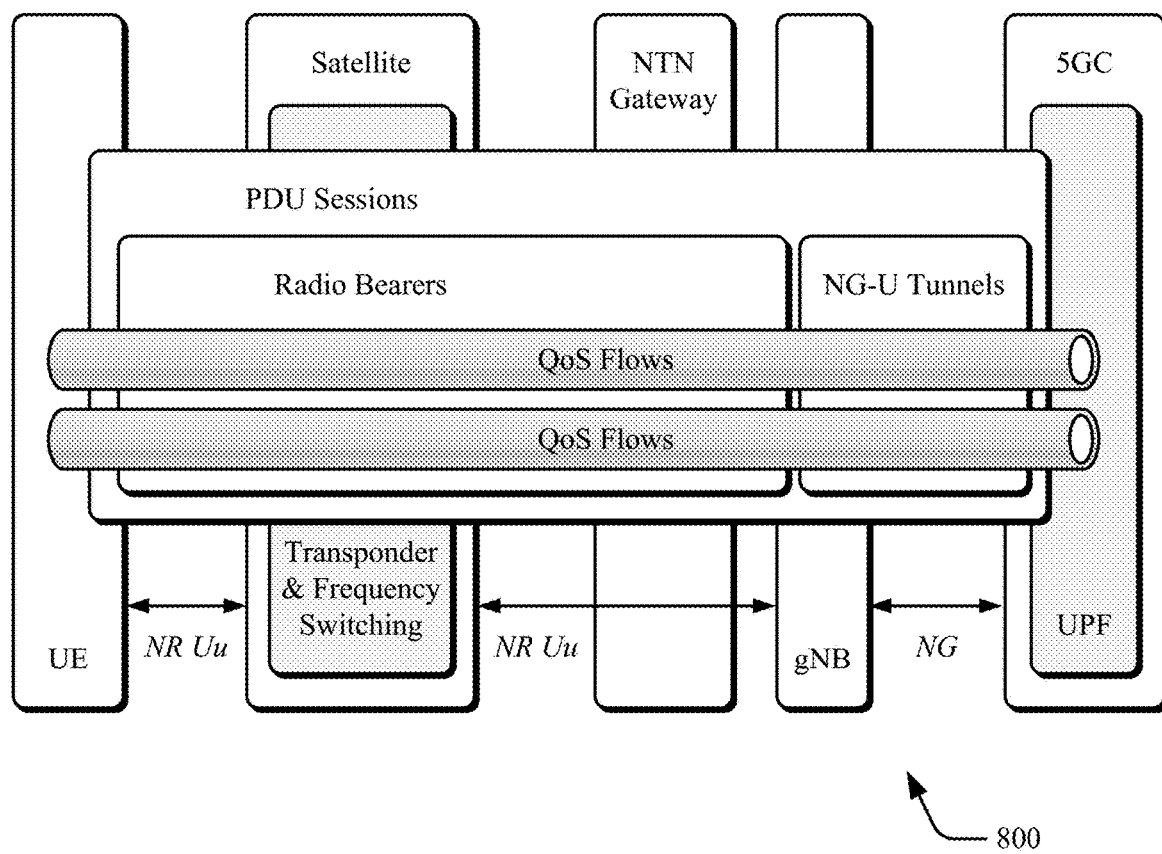
FIG. 8 illustrates an example of a transparent satellite-based NG-RAN architecture, adaptable for signal isolation using polarization in an NTN in accordance with aspects of the present disclosure.
Figure 9:
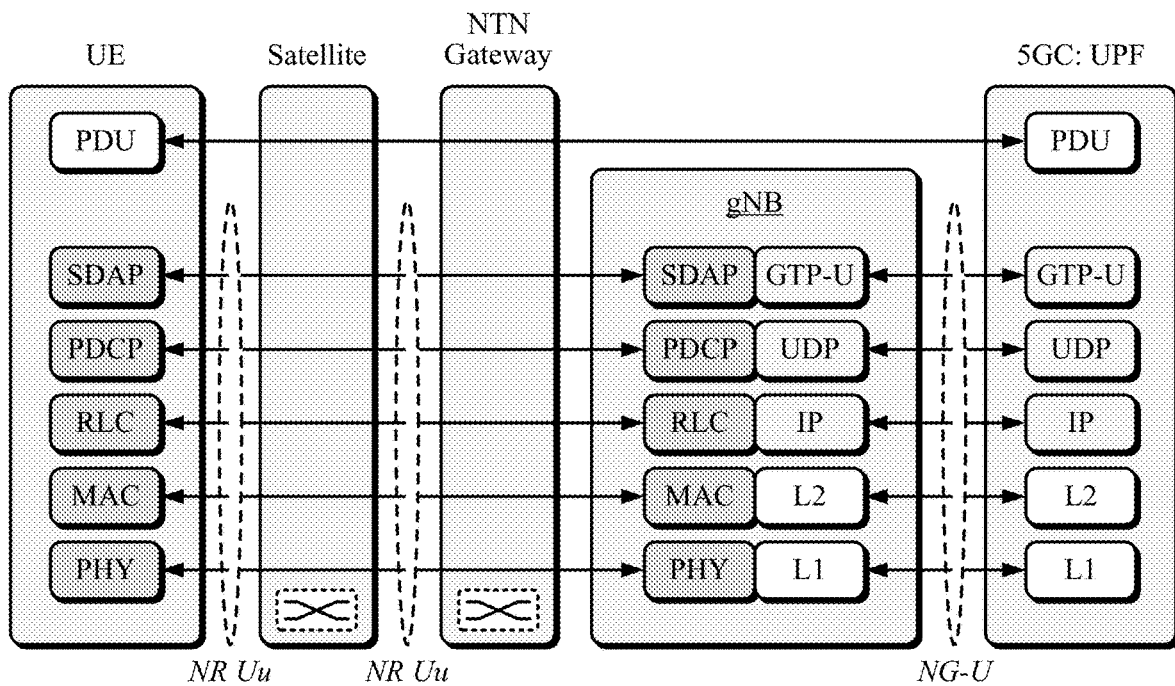
FIG. 9 illustrates an example of the UE user plane protocol stack for the transparent satellite-based NG-RAN architecture, adaptable for signal isolation using polarization in an NTN in accordance with aspects of the present disclosure.
Figure 10:
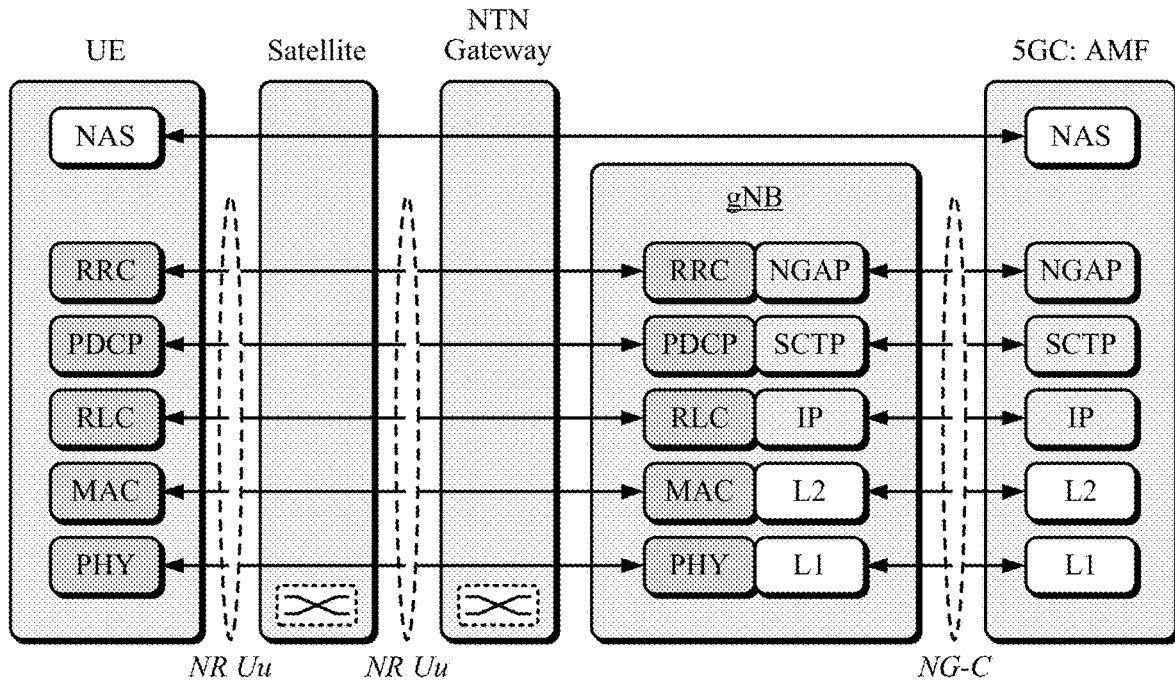
FIG. 10 illustrates an example of the control plane protocol stack for the transparent satellite-based NG-RAN architecture, adaptable for signal isolation using polarization in an NTN in accordance with aspects of the present disclosure.

FIG. 8 illustrates an example 800 of a transparent satellite-based NG-RAN architecture with mapping to quality of service (QoS) flows. The UE 104 has access to the 5G system via a 3GPP NR-based radio interface. FIG. 9 illustrates an example 900 of the UE user plane protocol stack for the transparent satellite-based NG-RAN architecture. The user data is transported between the UE 104 and the 5GC via the NTN gateway. FIG. 10 illustrates an example 1000 of the control plane protocol stack for the transparent satellite-based NG-RAN architecture. The non-access stratum (NAS) (NAS-SM and NAS-MM) signaling from the UE 104 and the NG-AP signaling from the gNB are transported toward the 5GC and vice-versa.

Figure 11:
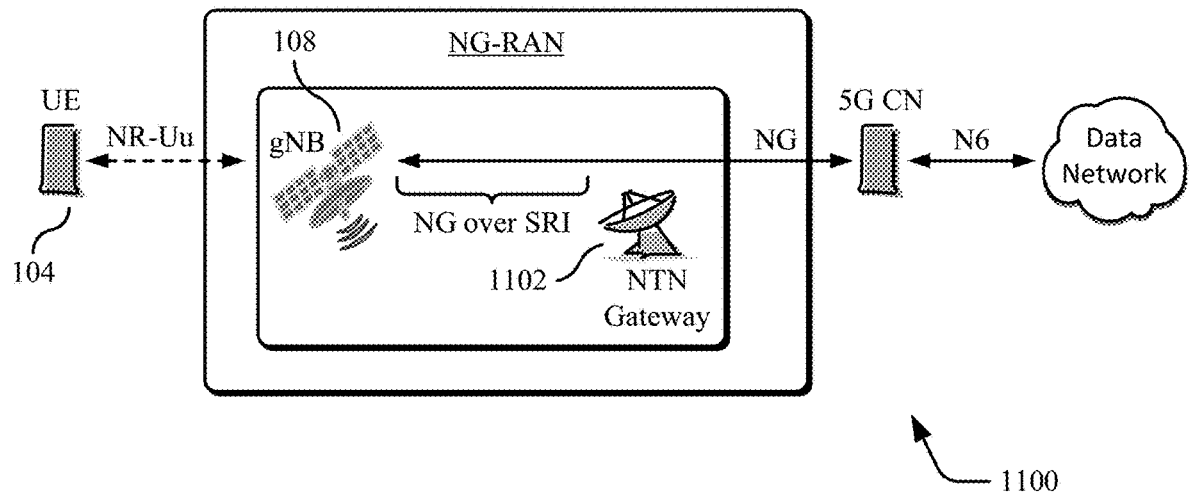
FIG. 11 illustrates an example regenerative satellite-based NG-RAN architecture that supports signal isolation using polarization in an NTN in accordance with aspects of the present disclosure.

FIG. 11 illustrates a regenerative satellite-based NG-RAN architecture 1100, such as a regenerative satellite without an inter-satellite link (ISL), and with a gNB-processed payload. The NG-RAN logical architecture may be used as baseline for an NTN. The satellite payload implements regeneration of the signals received from ground-based network nodes. In this architecture 1100, the NR-Uu radio interface is implemented on the service link between the UE 104 and the satellite (e.g., a NTS 108), and the satellite radio interface (SRI) is implemented on the feeder link between the NTN gateway 1102 and the satellite. The satellite radio interface (SRI) is a transport link between the NTN gateway 1102 and the satellite.

Figure 12:
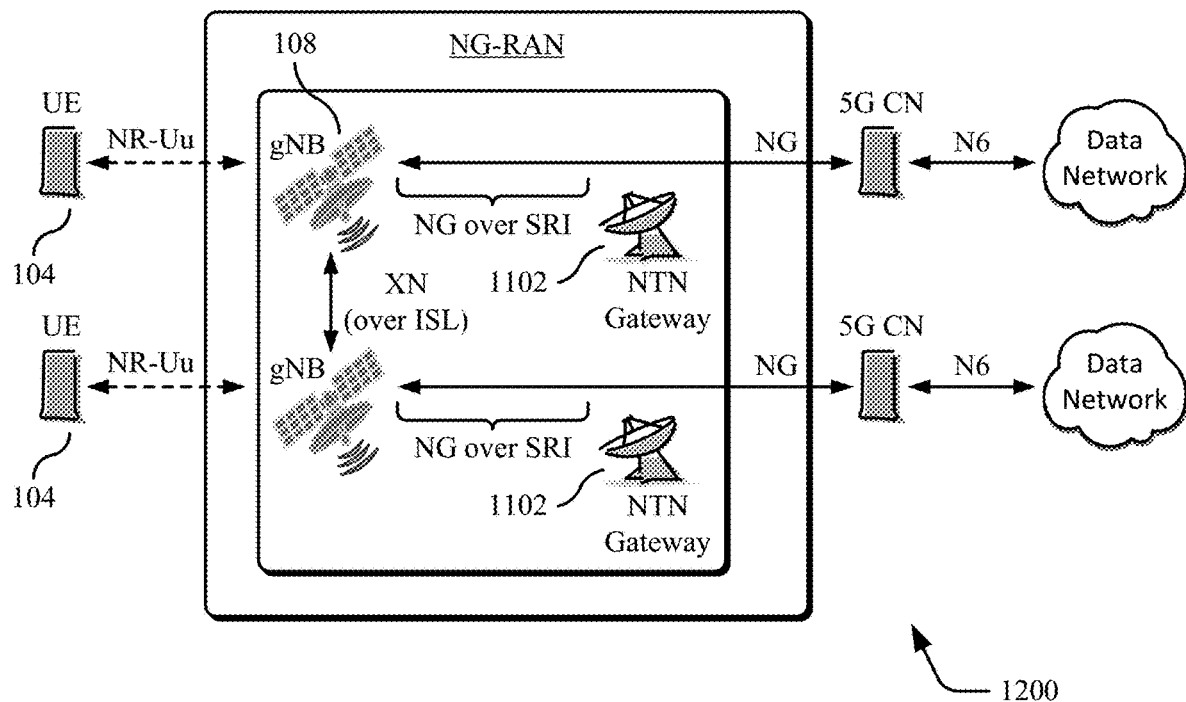
FIG. 12 illustrates another example regenerative satellite-based NG-RAN architecture that supports positioning in an NTN in accordance with aspects of the present disclosure.

FIG. 12 illustrates another example of a regenerative satellite-based NG-RAN architecture 1200, such as a regenerative satellite system with an inter-satellite link (ISL). The inter-satellite link (ISL) is a transport link, such as a radio interface or an optical interface, between satellites (e.g., NTSs 108). The NTN gateway 1102 is a transport network layer node, and supports all necessary transport protocols. In this architecture 1200, a UE 104 that is served by a gNB onboard a satellite could access the 5GCN via the inter-satellite link (ISL). In implementations, the gNB onboard different satellites may be connected to the same 5GCN on the ground, and if a satellite hosts more than one gNB, the same satellite radio interface (SRI) may be used to transport all the corresponding NG interface instances. In this architecture, the protocol stack of the satellite radio interface (SRI) is used to transport the UE user plane between a satellite and an NTN gateway 1102. The user protocol data units (PDUs) are transported over GTP-U tunnels between the 5GCN and the onboard gNB, via the NTN gateway 1102. The NG-AP is transported over SCTP, between the 5GCN and the onboard gNB via the NTN gateway. The NAS protocol is also transported by the NG-AP protocol, between the 5GCN and the onboard gNB, via the NTN gateway.

Figure 13:
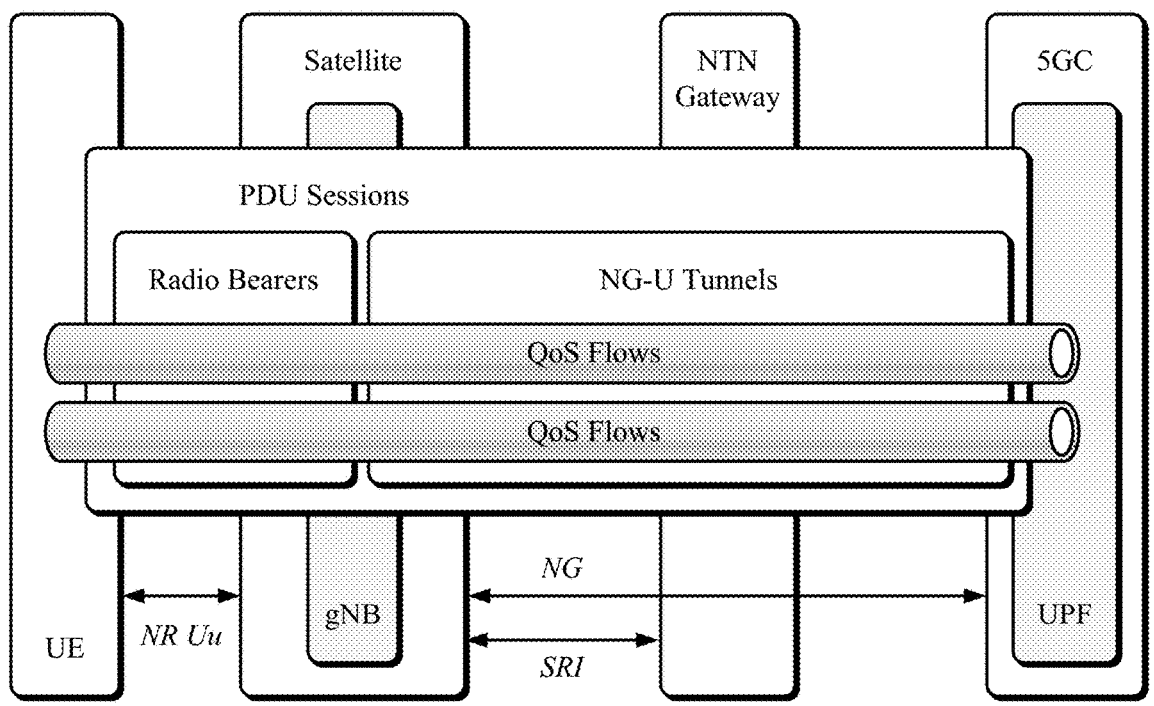
FIG. 13 illustrates an example of a regenerative satellite-based NG-RAN architecture with gNB onboard, adaptable for signal isolation using polarization in an NTN in accordance with aspects of the present disclosure.
Figure 14:
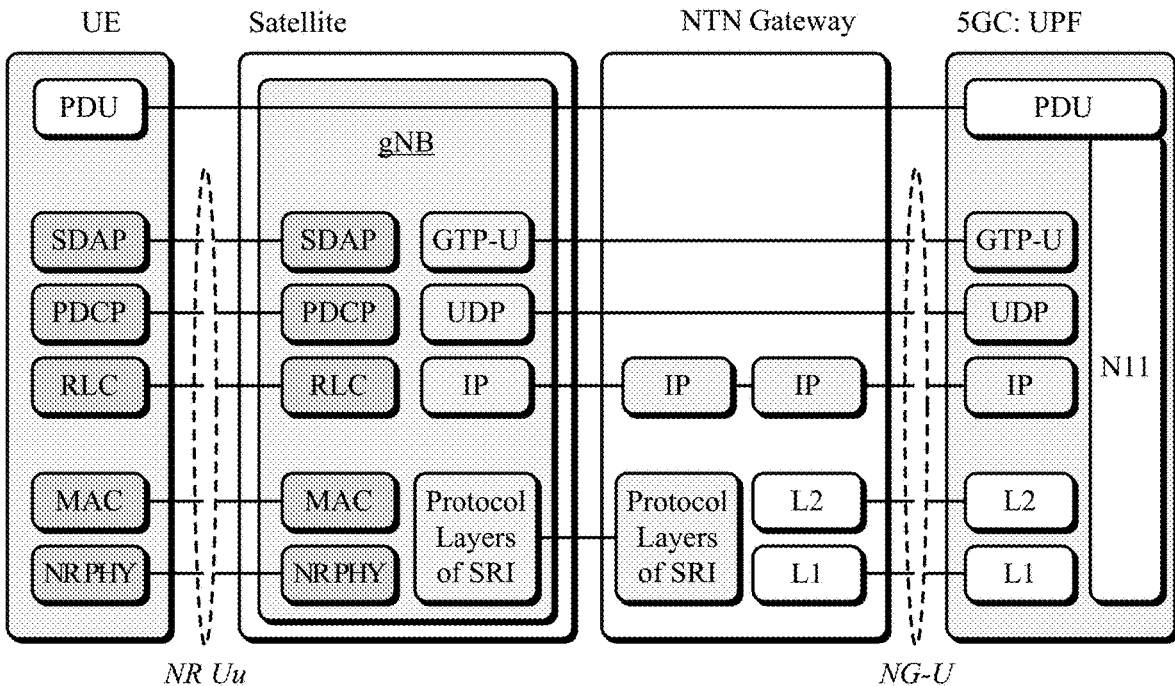
FIG. 14 illustrates an example of the UE user plane protocol stack for a protocol data unit (PDU) session, with respect to the regenerative satellite-based NG-RAN architecture with the gNB onboard, adaptable for signal isolation using polarization in an NTN in accordance with aspects of the present disclosure.
Figure 15:
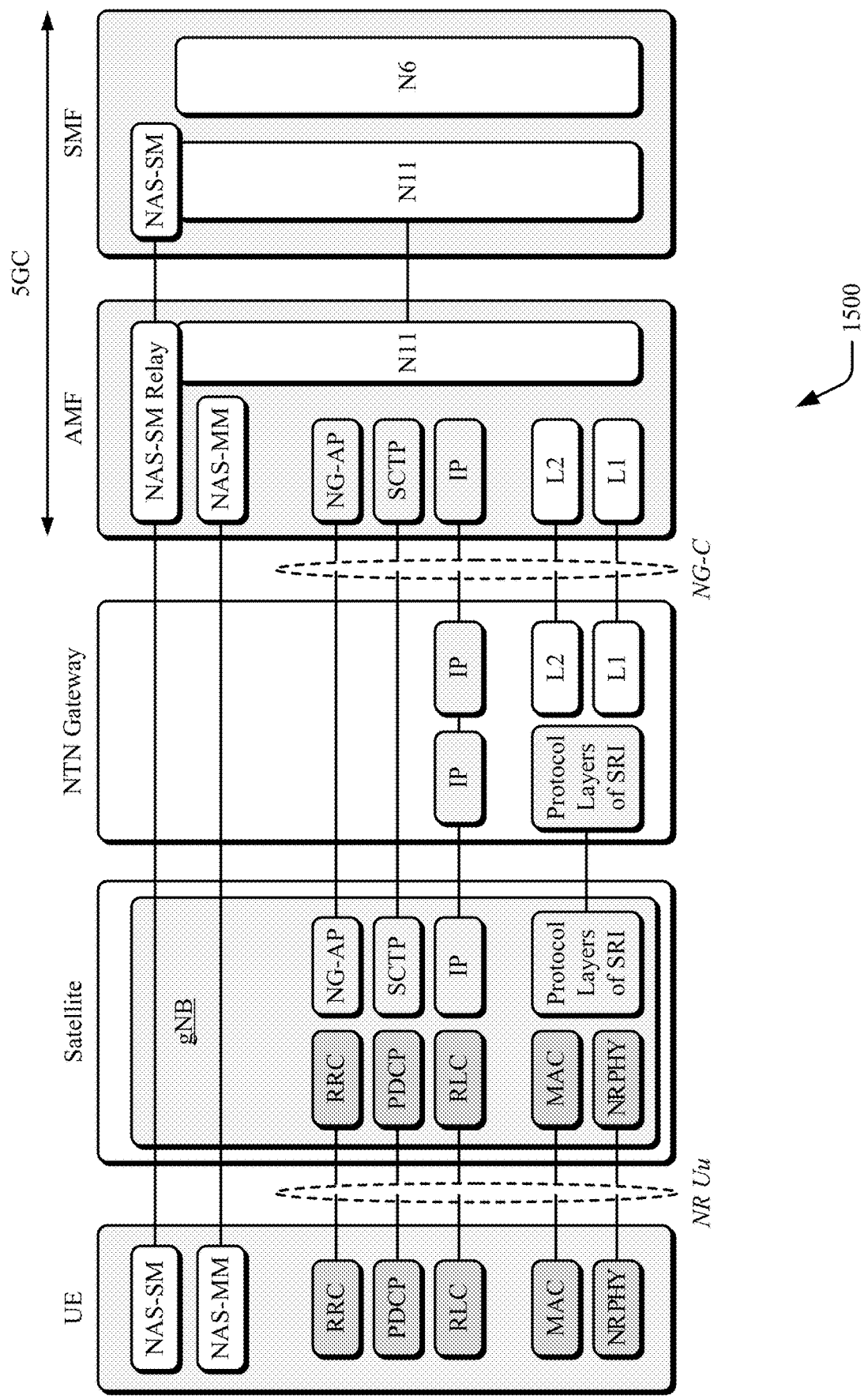
FIG. 15 illustrates an example of the UE control plane protocol stack for a PDU session, with respect to the regenerative satellite-based NG-RAN architecture with the gNB onboard, adaptable for signal isolation using polarization in an NTN in accordance with aspects of the present disclosure.

FIG. 13 illustrates an example 1300 of a regenerative satellite-based NG-RAN architecture with gNB onboard, and the quality of service (QoS) flows. FIG. 14 illustrates an example 1400 of the UE user plane protocol stack for a PDU session, with respect to the regenerative satellite-based NG-RAN architecture with the gNB onboard. The protocol stack of the satellite radio interface (SRI) is used to transport the UE user plane between the satellite and the NTN gateway. The user protocol data units (PDUs) are transported over GTP-U tunnels between the 5GC and the onboard gNB, via the NTN gateway. FIG. 15 illustrates an example 1500 of the UE control plane protocol stack for a PDU session, with respect to the regenerative satellite-based NG-RAN architecture with the gNB onboard. The NG-AP is transported over SCTP, between the 5GC and the onboard gNB, via the NTN gateway. The non-access stratum (NAS) protocol is also transported by the NG-AP protocol, between the 5GC and the onboard gNB, via the NTN gateway.

Aspects of the present disclosure extend the positioning reference signals design in a polarization domain such that positioning reference signals (PRSs) are configured to be associated with one or multiple specific polarization beam types to perform corresponding positioning measurements at the UE. Moreover, enhancements to reporting configurations are implemented to further indicate the polarization-based measurement quantities from a UE to the network for one or multiple positioning methods (techniques, procedures). Enhancements for a polarization-based PRS design are described. The signaling procedures (methods, techniques) include association and configuration of a polarization type with positioning reference signals (PRSs) to isolate PRS tones at the cell, TRP, resource set, or resource level. The signaling procedures (techniques) also include configuration of multiple polarizations that are associated with a single beam, and are transmitted from the same node to enhance PRS coverage. The signaling procedures (techniques) also include configuration of polarization-based UE measurement reports common or specific to positioning methods.

As used herein, a positioning-related reference signal may refer to a reference signal used for positioning techniques, positioning procedures, positioning methods, and/or positioning purposes to estimate a location of a target UE. A reference signal may be a PRS, or based on existing reference signals, such as a SRS. A target UE may be referred to as the UE, device, or entity to be localized and/or positioned based on a positioning determination. A UE may be referred to as a target UE or as the UE of interest, for which the positioning is to be determined or calculated by a network entity or by the UE itself.

Notably, any of the positioning techniques described in the present disclosure may be implemented in combination with any additional positioning techniques described in the related disclosures: U.S. patent application Ser. No. 17/554,916 entitled "Positioning in a Non-Terrestrial Network" filed Dec. 17, 2021; U.S. patent application Ser. No. 17/554,583 entitled "Configuration and Reporting in a Non-Terrestrial Network" filed Dec. 17, 2021; U.S. patent application Ser. No. 17/555,164 entitled "Positioning Capability Data Exchange in a Non-Terrestrial Network" filed Dec. 17, 2021, the full disclosures of which are incorporated by reference herein in their entirety.

In aspects of signal isolation using polarization in an NTN, polarization is associated and configured with PRS. One or multiple polarization types (i.e., right hand circular polarized (RHCP) and left hand circular polarized (LHCP)) are associated with different PRS signals in an NTN beam or a cell. This provides another dimensionality to generate orthogonal signals to avoid interference, and also provides flexibility to efficiently utilize frequency domain resources. In addition, the association of polarization types to the reference signals can improve the reference signal reception performance, which in the case of positioning, can increase the measurement accuracy and thus the localization performance. In an implementation, one resource set is associated with a single polarization type, where all of the beams in the set use the same polarization type (i.e., right hand circular polarized (RHCP) or left hand circular polarized (LHCP)).

Figures 16, 17:
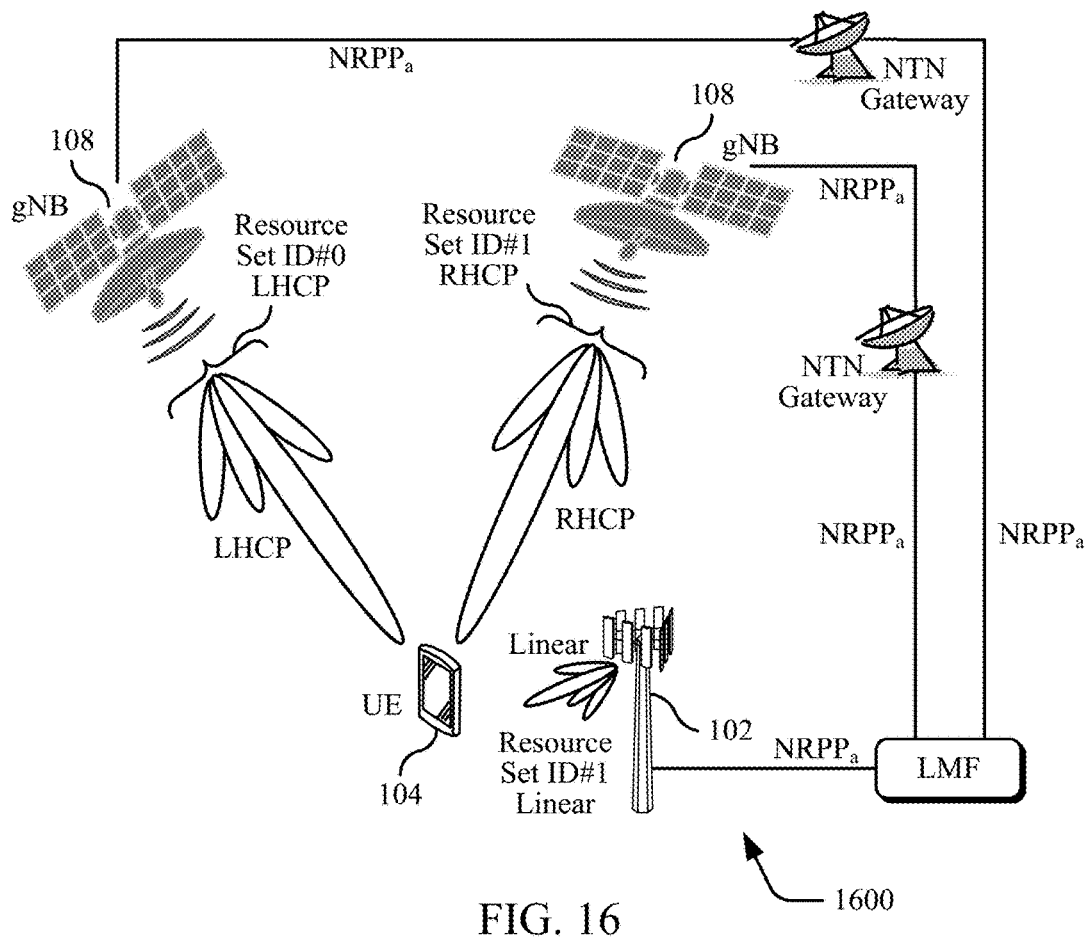
FIG. 16 illustrates an example of a UE configured with PRS resources from non-terrestrial stations (NTSs) and a TN gNB, as related to signal isolation using polarization in an NTN in accordance with aspects of the present disclosure.
FIG. 17 illustrates an example of an information element (IE) with a PRS-ResourceSetlD that designates a polarization type, as related to signal isolation using polarization in an NTN in accordance with aspects of the present disclosure.

FIG. 16 illustrates an example 1600 of a UE 104 configured with PRS resources from NTSs 108 and a TN gNB, as related to signal isolation using polarization in an NTN in accordance with aspects of the present disclosure. Both of the NTSs 108 (e.g., satellites) use different polarizations (left hand circular polarized (LHCP) and right hand circular polarized (RHCP)) for a set of beams, which are configured by one resource set ID for one satellite, while the TN (e.g., base station 102) uses conventional linear polarization. Some of the beams from both satellites cover the same area and employ the same time and frequency resources, thus improving the higher frequency reuse significantly.

FIG. 17 illustrates an example 1700 of an information element (IE) 1702 with a PRS-ResourceSetID that designates a polarization type at 1704, as related to signal isolation using polarization in an NTN in accordance with aspects of the present disclosure. An indication of the configuration can be added as a new field in the information element (IE) NR-DL-PRS-Info, for example the nr-DL-PRS-ResourceSetID-Pol, where one data bit may indicate one polarization type (e.g., zero (0) for left hand circular polarized (LHCP) and one (1) for right hand circular polarized (RHCP)). For three or more polarization types that are associated (i.e., RHCP, LHCP, and linear (vertical or horizontal)), two data bits may indicate one type of polarization. In an implementation, a data bit string can be used to indicate the polarization type, where a bit string of size two (2) or four (4) may be used based on the number of supported polarization types. In another implementation, the proposed nr-DL-PRS-ResourceSetID-Pol field may be an integer or enumeration indicating the different supported and/or configured types of polarization by the LMF.

FIG. 18 illustrates an example 1800 of an information element (IE) 1802 with a quasi co-location (QCL) type used to indicate an association between downlink source reference signals and target reference signals in terms of a polarization type at 1804 and 1806, as related to signal isolation using polarization in an NTN in accordance with aspects of the present disclosure. The QCL is an indication used to indicate the association between downlink source reference signals and target reference signals in terms of the polarization type. In an implementation, a new QCL choice is added in the information element (IE) NR-DL-PRS-Info. For example, if polarization is associated with a resource set, then qcl-DL-PRS-ResourceSetID-r16 may be extended to include association between polarizations. For example, qcl-DL-PRS-ResourceSetID-LC-r16 is used to indicate left hand circular polarized (LHCP) while qcl-DL-PRS-ResourceSetID-RC-r16 may be used to indicate right hand circular polarized (RHCP). In an implementation, a new choice is added in the information element (IE) NR-DL-PRS-Info that describe the QCL association. In another implementation, the resource set is QCLed with the synchronization signal block (SSB) polarization. In such a case, the definition of existing QCL type C and D are either modified to include the polarization indication, or a new QCL type (for example QCL Type-E) can be used to indicate the association. In an alternative implementation, the resource set may also be QCLed with a different PRS based on the existing (QCL type C and D assumptions) or newly proposed QCL assumptions FIG. 19 illustrates an example 1900 of an information element (IE) with a PRS-AssistanceData that designates a polarization type at 1904, as related to signal isolation using polarization in an NTN in accordance with aspects of the present disclosure. In an implementation, one polarization type can be associated with a PRS configuration for one cell. This type of implementation accommodates NTN architectures, where one beam may be associated to a cell. In the event of multiple beams in a cell, all of the resource sets may use the same polarization, and the configuration provides for orthogonal PRS resources for at least two gNBs (satellites) cell while using the same frequency and time resources. In an implementation, the type of polarization may be indicated by a new field in IE NR-DL-PRS-AssistanceData, for example nr-DL-PRS-Cell-Pol, where a bitstring, an integer value, or an enumeration may be used to indicate the type of polarization. In an implementation, the cell-IDs are preconfigured with a polarization type, and the existing cell-ID indication by the pci-r16 field in information element (IE) NR-DL-PRS-Info can be used for this purpose. In another implementation, this information is indicated by a new field in IE NR-DL-PRS-BeamInfo.

FIG. 20 illustrates an example 2000 of an information element (IE) 2002 with an indication of the polarization type for specific PRS beam ID at 2004, as related to signal isolation using polarization in an NTN in accordance with aspects of the present disclosure. The polarization type is associated with a single TRP, which may be indicated by a new field, for example nr-DL-PRS-TRP-Pol-r16 in the information element (IE) NR-DL-PRS-BeamInfo, where a bitstring or an integer value may be used to indicate different polarization types. In an implementation, the polarization types may be associated with a group of TRPs. The polarization type is associated with each beam in a resource set ID.

This configuration provides flexibility to define orthogonal resources at the beam level, thus reducing the inter-beam interference. In an NTN, it is useful because the beam footprint diameter is relatively very large, and adjacent beams are overlapping for a large area. In this instance, the polarization type for a specific PRS beam ID can be indicated in the information element (IE) DL-PRS-ID-Info by introducing a new field, for example dl-PRS-ID-Pol-r16, where it uses a bitmap or an integer value to associate a polarization type.

In another implementation, the PRS beam ID may be QCLed with an SSB-ID where such information may be indicated in IE NR-DL-PRS-Info.

In an implementation, the LMF or central unit (CU) may configure (spatially) adjacent beams with different polarizations with a set of rules for such configuration. For instance, in one implementation, if adjacent beams or cells in a PRS configuration reuse the same frequency resources, then there will be a rule to configure different or alternating polarizations for adjacent cells and/or beams. In another implementation, if two satellite gNBs are likely to cover a common area with PRS on overlapping time-frequency resources, then the LMF or CU will configure associated PRS with different circular polarization. In this example, the LMF or CU can obtain ephemeris data (location, velocity, nominal/actual orbit, etc.) for the associated gNB satellites, and compute a likelihood as the probability or overlapping duration divided by total duration smaller than a threshold. These parameters may be obtained through request-response signaling between the LMF and gNB, or between the CU and DU, or between the LMF and a gateway, or between the location management component (LMC) and a gNB satellite (if the location management component (LMC) is implemented at the gateway).

In some implementations, PRS pattern parameters may be configured to change polarization over time in order to avoid interference in the presence of drifting patterns, as observed from the perspective of a UE. In another implementation, a PRS periodicity may be different for different beams based on the polarization employed. This is particularly useful when different beams are used by the satellite (gNB) to cover different geographical areas, which may then experience a different number of satellites interfering or drifting in terms of PRS resource patterns. An association of periodicity with a specific polarization and/or beam may be indicated by an reference signal ID (RS ID) or a quasi co-location (QCL) relationship. Alternatively, an association with a specific polarization type employed in a beam may be indicated indirectly through indication of bandwidth part (BWP), which may be realized in configurations that include associations between beams, bandwidth parts (BWPs), and/or polarization type, such as when there is a one-to-one indication between beams and/or polarization type and/or bandwidth parts (BWPs). In an example, a first periodicity P1 may be indicated for a beam B1 and/or bandwidth part (BWP) W1 and/or left hand circular polarized (LHCP); a second periodicity P2 may be indicated for a beam B2 and/or bandwidth part (BWP) W1 and/or right hand circular polarized (RHCP), and so on.

The LMF can configure the polarization types via LTE positioning protocol (LPP) signaling to the UE, using the ProvideAssistanceData message or NTNConfiguration message, as described in the related disclosures incorporated above. In alternative implementation, if the gNB has LMF functionality (e.g. location management unit (LMU) capabilities) or is co-located with an LMF, or if the NTN TRP has partial or full functionality of the LMF, then the polarization may be signaled via lower layer signaling, such as DCI, MAC CE or RRC signaling.

Aspects of the disclosure takes into account PRS coverage enhancement using polarization multiplexing. The UE is configured with one or two beams with different circular polarizations (i.e., left hand circular polarized (LHCP) and right hand circular polarized (RHCP), from a single NTN node (e.g., NTS, satellite, gateway, or gNB) while utilizing the same time and frequency resources. Interference mitigation between PRS resources is obtained by maintaining orthogonality in a time and frequency domain, such as utilizing PRS configuration, while polarization is used for diversity (receive signal-to-noise ratio (SNR) improvement). This example configuration can be a repetition in the polarization domain or polarization multiplexing that improves the reliability of the downlink PRS reception, and thus improves the measurement accuracy of the supported positioning measurements (e.g. downlink RSTD, PRS RSRP, and UE Rx-Tx time difference). This is a factor in an NTN where larger path loss and the mobility of LEO satellites may reduce the overall coverage.

The polarization multiplexing can be configured at a cell level, where all of the configured PRS resources in a cell use both circular polarization types for PRS transmission. This may be indicated by a new field in the information element (IE) NR-DL-PRS-AssistanceData, for example nr-DL-PRS-Cell-PolMux, where one data bit may be used to indicate that polarization multiplexing is on or off at the cell level. In an implementation, the polarization multiplexing is configured at a TRP level, where some TRPs utilize two polarizations for all of the resource IDs. This may be configured by a new field, for example nr-DL-PRS-TRP-PolMux-r16, in the information element (IE)NR-DL-PRS-BeamInfo.

In an implementation, the polarization multiplexing is configured for certain resource set IDs where dual circular polarization is used for all beams in that resource set ID. This may be configured in the information element (IE) NR-DL-PRS-Info by a new field, for example nr-DL-PRS-ResourceSetID-PolMux. In an implementation, a single data bit may be used to indicate that polarization multiplexing is on or off. In another implementation, the polarization multiplexing is configured at beam level, where each PRS beam may or may not apply dual polarization transmission. This may be indicated in the information element (IE) DL-PRS-ID-Info by introducing a new field, for example, dl-PRS-ID-PolMux-r16. In some implementations, the configuration of polarization multiplexing is optional, and if the configuration of polarization multiplexing is absent, the UE can assume no polarization multiplexing.

In an implementation, for each time domain repetition, a different polarization type can be used. This can improve the reliability of downlink PRS signals for some instances, such as when a single type of polarization results in poor signal quality due to environmental factors. In addition, dl-PRS-ResourceRepetitionFactor, specifies how many times each downlink PRS resource is repeated for a single instance of the downlink PRS resource set in the information element (IE) NR-DL-PRS-Info, and a different combination of polarization association with the indicated repetitions may be configured by a new field. If the field is absent, it is assumed that a same polarization is used for all repetitions.

In some implementations, the polarization multiplexing is specific to the deployed positioning method, and the polarization multiplexing can be configured by the specific position method information elements (IEs). The configuration of polarization multiplexing at the beam, TRP, or cell level is configured in the specific position method information elements (IEs). In some implementations, the polarization multiplexing may be common to all of the positioning methods, and the polarization multiplexing can be configured by LTE positioning protocol (LPP) or radio resource control (RRC) configuration.

FIG. 21 illustrates an example 2100 of an information element (IE) 2102 with a measurement report that indicates the polarization type at 2104, as related to signal isolation using polarization in an NTN in accordance with aspects of the present disclosure. The measurement report from the UE can include an indication of the polarization type on which the measurement is carried out. This may be indicated in measurement related information elements (IEs) of different positioning techniques. In one implementation, where measurement is carried out on one beam with a certain polarization type from each NTN node, the measurement report can include the polarization type. This example 2100 illustrates the configuration for the information element (IE) NR-DL-TDA-SignalMeasurementInformation, which is used by the target UE to provide NR DL-TDOA measurements to the location server. A new field can be added to indicate the polarization type for which the RSTD measurements are carried out.

In another implementation, both polarizations can be used for measurement purposes, and the measurement results for both polarizations may be indicated in the measurement report. For instance, in the example information element (IE) 2102, the field nr-RSTD-r16 may be modified for specific polarization, such as nr-RSTD-LH-r16 and nr-RSTD-RH-r16, where both fields are used to indicate the RSTD for the respective polarization. A UE may be configured with N-PRS measurement instances or samples, where each measurement sample or instance is associated with a polarization type. In this example, the UE can be configured to report measurement results associated with each of polarization types. The UE can report results for each of the measurements samples or instances, and may report the combined measurement samples associated with a polarization type.

The uplink positioning measurement reports, which are based on the SRS received from the gNB, are also associated with a polarization type. This can also be separately configured by the network in addition to the PRS configuration. Additionally, the measurements associated with each polarization may be associated with a time stamp, depending on whether one or both polarizations have been used. Each time stamp measurement may also have an associated time stamp quality indicator, indicating the quality of the timing measurement.

In another implementation, a transmit (Tx) timing error due to the transmission of PRS from each polarization type may be compensated. From the perspective of signal transmission, there will be a time delay from the time when the digital signal is generated at baseband to the time when the RF signal is transmitted from the transmit (Tx) antenna. To support positioning reference signal transmissions from both polarization types, the NTN TRP may implement an internal calibration or compensation of the transmit (Tx) time delay for the transmission of the downlink PRS signals, depending on the polarization type, which may also include the compensation of the relative time delay between different RF chains in the same TRP and/or UE. The compensation may also take into account the offset of the transmit (Tx) antenna phase center to the physical antenna center. However, with this implementation-specific calibration, there may be a remaining transmit (Tx) time delay after the calibration, and the uncalibrated transmit (Tx) time delay is defined as transmit (Tx) timing error.

Similarly, the receive (Rx) timing error due to the reception of positioning reference signals (PRSs) from each polarization type may be compensated. From the perspective of signal reception, there will be a time delay from the time when the RF signal arrives at the receive (Rx) antenna to the time when the signal is digitized and time-stamped at the baseband. To support positioning reference signal reception from different polarization types, the UE may implement an internal compensation of the receive (Rx) time delay for the reception of the downlink PRS signals depending on the polarization type, which may also include the compensation of the relative time delay between different RF chains in the same UE. The compensation may also take into account the offset of the receive (Rx) antenna phase center to the physical antenna center. However, with this implementation-specific calibration, the remaining receive (Rx) time delay after the calibration, or the uncalibrated receive (Rx) time delay, may be defined as receive (Rx) timing error.

The NTN transmit (Tx) timing error group (TEG) and the UE receive (Rx) UE Rx timing error group (TEG) may be compensated for by reporting the corresponding transmit (Tx) and/or receive (Rx) timing error group (TEG) value to the LMF. The transmit (Tx) timing error group (TEG) may be reported by the NTN TRP to the LMF via the functional interface between the two entities (e.g., the NRPPa-like interface), while the receive (Rx) timing error group (TEG) may be reported to the LMF via LTE positioning protocol (LPP) signaling. A transmit (Tx) timing error group (TEG) in this example can be defined as an association of the transmissions of one or more downlink PRS resources with the same polarization type, which have the transmit (Tx) timing errors within a certain timing error margin. A transmit (Tx) timing error group (TEG) can be defined as an association of the reception of one or more downlink PRS resources with the same polarization type. Furthermore, the transmit (Tx) and receive (Rx) timing error groups (TEGs) may also be reported for all downlink-based and (downlink (DL)+ uplink (UL)) positioning methods, including DL-TDOA, DL-AoD, and multi-RTT. In some implementations, the transmit (Tx) and receive (Rx) timing error groups (TEGs) may also be reported in the event the LW IF has not configured a particular polarization type for the NTN TRP.

Figure 22:
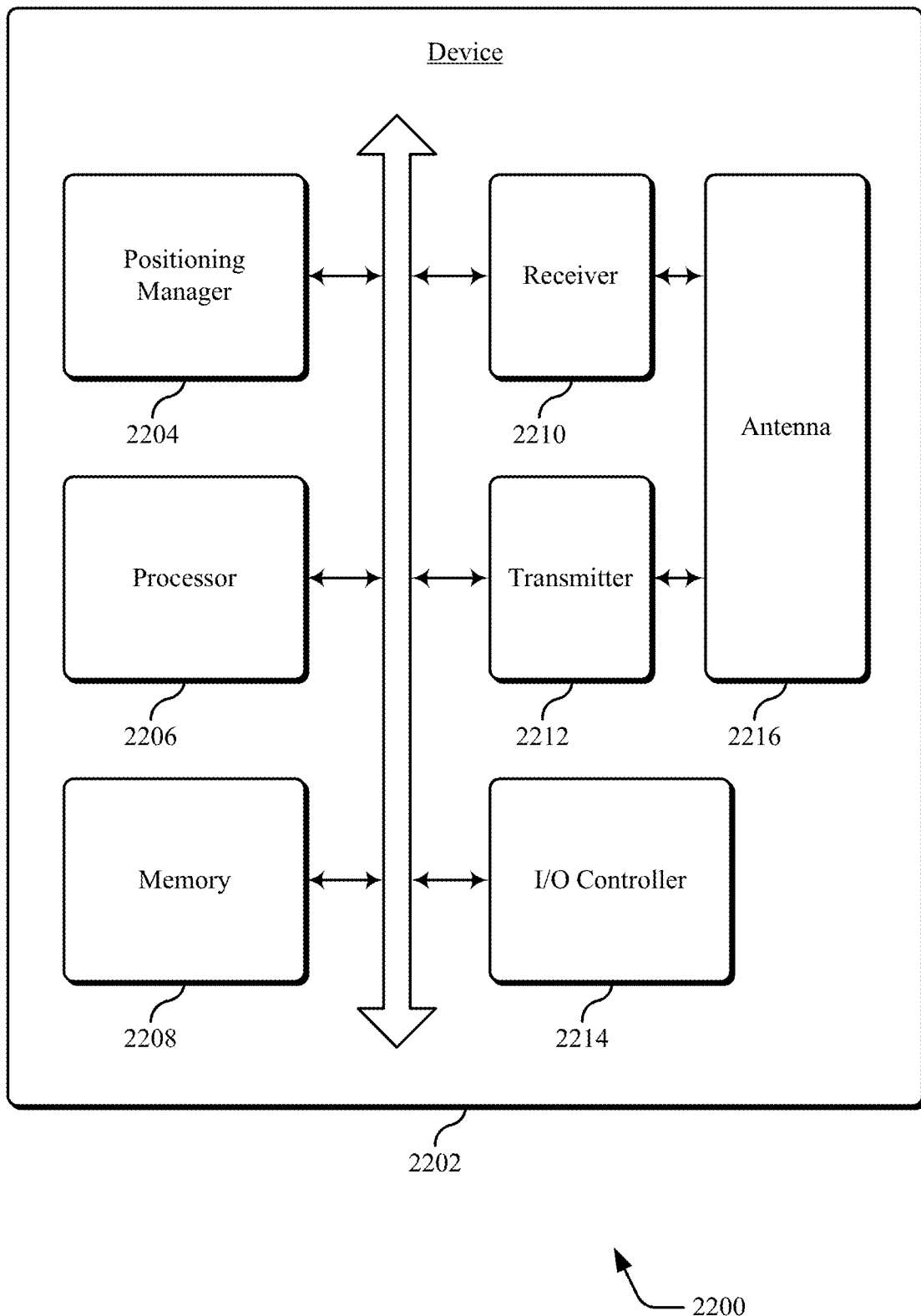
FIG. 22 illustrates an example block diagram of components of a device that supports signal isolation using polarization in an NTN in accordance with aspects of the present disclosure.

FIG. 22 illustrates an example of a block diagram 2200 of a device 2202 that supports signal isolation using polarization in an NTN in accordance with aspects of the present disclosure. The device 2202 may be an example of a UE 104 as described herein. The device 2202 may support wireless communication and/or network signaling with one or more base stations 102, UEs 104, or any combination thereof. The device 2202 may include components for bi-directional communications including components for transmitting and receiving communications, such as a positioning manager 2204, a processor 2206, a memory 2208, a receiver 2210, a transmitter 2212, and an I/O controller 2214. These components may be in electronic communication or otherwise coupled (e.g., operatively, communicatively, functionally, electronically, electrically) via one or more interfaces (e.g., buses).

The positioning manager 2204, the receiver 2210, the transmitter 2212, or various combinations thereof or various components thereof may be examples of means for performing various aspects of the present disclosure as described herein. For example, the positioning manager 2204, the receiver 2210, the transmitter 2212, or various combinations or components thereof may support a method for performing one or more of the functions described herein.

In some implementations, the positioning manager 2204, the receiver 2210, the transmitter 2212, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2206 and the memory 2208 coupled with the processor 2206 may be configured to perform one or more of the functions described herein (e.g., by executing, by the processor 2206, instructions stored in the memory 2208).

Additionally or alternatively, in some implementations, the positioning manager 2204, the receiver 2210, the transmitter 2212, or various combinations or components thereof may be implemented in code (e.g., as communications management software or firmware) executed by the processor 2206. If implemented in code executed by the processor 2206, the functions of the positioning manager 2204, the receiver 2210, the transmitter 2212, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the positioning manager 2204 may be configured to perform various operations (e.g., receiving, monitoring, transmitting) using or otherwise in cooperation with the receiver 2210, the transmitter 2212, or both. For example, the positioning manager 2204 may receive information from the receiver 2210, send information to the transmitter 2212, or be integrated in combination with the receiver 2210, the transmitter 2212, or both to receive information, transmit information, or perform various other operations as described herein. Although the positioning manager 2204 is illustrated as a separate component, in some implementations, one or more functions described with reference to the positioning manager 2204 may be supported by or performed by the processor 2206, the memory 2208, or any combination thereof. For example, the memory 2208 may store code, which may include instructions executable by the processor 2206 to cause the device 2202 to perform various aspects of the present disclosure as described herein, or the processor 2206 and the memory 2208 may be otherwise configured to perform or support such operations.

For example, the positioning manager 2204 may support wireless communication at a device (e.g., the device 2202, an apparatus, UE) in accordance with examples as disclosed herein. The positioning manager 2204 and/or other device components may be configured as or otherwise support an apparatus, such as UE, including a receiver to: receive a first configuration associated with a set of positioning reference signals, the first configuration indicating a time and frequency resource for a positioning reference signal of the set of positioning reference signals; receive a second configuration associating a positioning measurement of the positioning reference signal on the time and frequency resource; receive one or more types of polarization associated with at least one of the first configuration or the second configuration; and a transmitter to: transmit a report indicating the one or more types of polarization associated with the positioning measurement of the positioning reference signal on the time and frequency resource.

Additionally, the apparatus (e.g., a UE) includes any one or combination of: one type of polarization is associated with a set of positioning reference signal beams of a serving cell. One type of polarization is configured to the set of the positioning reference signals associated with a transmission-reception point. One positioning reference signal resource set is associated with one type of polarization, and a set of positioning reference signal beams in the one positioning reference signal resource set are associated with the one type of polarization. Each resource in a positioning reference signal resource set is associated with one type of polarization, and positioning reference signal beams within the positioning reference signal resource set have different types of polarization. An information element of the first configuration indicates a type of polarization at one of a serving cell, a transmission-reception point, a resource set, or a resource level for the positioning reference signal. An information element of the first configuration indicates a quasi co-location as an association between the set of positioning reference signals and target reference signals in terms of a type of polarization. The one or more types of polarization include at least two types of polarization, and wherein the apparatus is configured to select at least one of the two types of polarization for the positioning measurement. The receiver is configured to receive the set of positioning reference signals associated with one or more types of polarization of non-terrestrial network signal beams. The apparatus further comprising a positioning manager to perform the positioning measurement on the positioning reference signal; and determine the one or more types of polarization on which the positioning measurement is performed. Two types of polarization are applied for the positioning measurement of the positioning reference signal, and the report includes the positioning measurement for the two types of polarization.

The device components may be configured as or otherwise support a means for network signaling, wireless communication, and/or positioning tones isolation at a user equipment, including receiving a first configuration associated with a set of positioning reference signals, the first configuration indicating a time and frequency resource for a positioning reference signal of the set of positioning reference signals; receiving a second configuration associating a positioning measurement of the positioning reference signal on the time and frequency resource; receiving one or more types of polarization associated with at least one of the first configuration or the second configuration; and transmitting a report indicating the one or more types of polarization associated with the positioning measurement of the positioning reference signal on the time and frequency resource.

Additionally, the network signaling, wireless communication, and/or positioning tones isolation at the user equipment includes any one or combination of: one type of polarization is associated with a set of positioning reference signal beams of a serving cell. One type of polarization is configured to the set of the positioning reference signals associated with a transmission-reception point. One positioning reference signal resource set is associated with one type of polarization, and a set of positioning reference signal beams in the one positioning reference signal resource set are associated with the one type of polarization. Each resource in a positioning reference signal resource set is associated with one type of polarization, and positioning reference signal beams within the positioning reference signal resource set have different types of polarization. An information element of the first configuration indicates a type of polarization at one of a serving cell, a transmission-reception point, a resource set, or a resource level for the positioning reference signal. An information element of the first configuration indicates a quasi co-location as an association between the set of positioning reference signals and target reference signals in terms of a type of polarization. The one or more types of polarization include at least two types of polarization, and the method further comprising selecting at least one of the two types of polarization for the positioning measurement. Polarization multiplexing is configured for a serving cell, and configured positioning reference signal resources associated with the serving cell utilize both right-hand circular polarization and left-hand circular polarization. Polarization multiplexing is configured for a transmission-reception point, and one or more transmission-reception points associate two types of polarization with resource set identifiers.

Polarization multiplexing is configured for one or more positioning reference signal beams, and each positioning reference signal beam within a resource set applies dual polarization transmission. Two types of polarization are applied for the positioning measurement of the positioning reference signal, and the report includes the positioning measurement for the two types of polarization.

The processor 2206 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2206 may be configured to operate a memory array using a memory controller. In some other implementations, a memory controller may be integrated into the processor 2206. The processor 2206 may be configured to execute computer-readable instructions stored in a memory (e.g., the memory 2208) to cause the device 2202 to perform various functions of the present disclosure.

The memory 2208 may include random access memory (RAM) and read-only memory (ROM). The memory 2208 may store computer-readable, computer-executable code including instructions that, when executed by the processor 2206 cause the device 2202 to perform various functions described herein. The code may be stored in a non-transitory computer-readable medium such as system memory or another type of memory. In some implementations, the code may not be directly executable by the processor 2206 but may cause a computer (e.g., when compiled and executed) to perform functions described herein. In some implementations, the memory 2208 may include, among other things, a basic I/O system (BIOS) which may control basic hardware or software operation such as the interaction with peripheral components or devices.

The I/O controller 2214 may manage input and output signals for the device 2202. The I/O controller 2214 may also manage peripherals not integrated into the device 2202. In some implementations, the I/O controller 2214 may represent a physical connection or port to an external peripheral. In some implementations, the I/O controller 2214 may utilize an operating system such as iOS®, ANDROID®, MS-DOS®, MS-WINDOWS®, OS/2®, UNIX®, LINUX®, or another known operating system. In some implementations, the I/O controller 2214 may be implemented as part of a processor, such as the processor 2206. In some implementations, a user may interact with the device 2202 via the I/O controller 2214 or via hardware components controlled by the I/O controller 2214.

In some implementations, the device 2202 may include a single antenna 2216. However, in some other implementations, the device 2202 may have more than one antenna 2216, which may be capable of concurrently transmitting or receiving multiple wireless transmissions. The receiver 2210 and the transmitter 2212 may communicate bi-directionally, via the one or more antennas 2216, wired, or wireless links as described herein. For example, the receiver 2210 and the transmitter 2212 may represent a wireless transceiver and may communicate bi-directionally with another wireless transceiver. The transceiver may also include a modem to modulate the packets, to provide the modulated packets to one or more antennas 2216 for transmission, and to demodulate packets received from the one or more antennas 2216.

Figure 23:
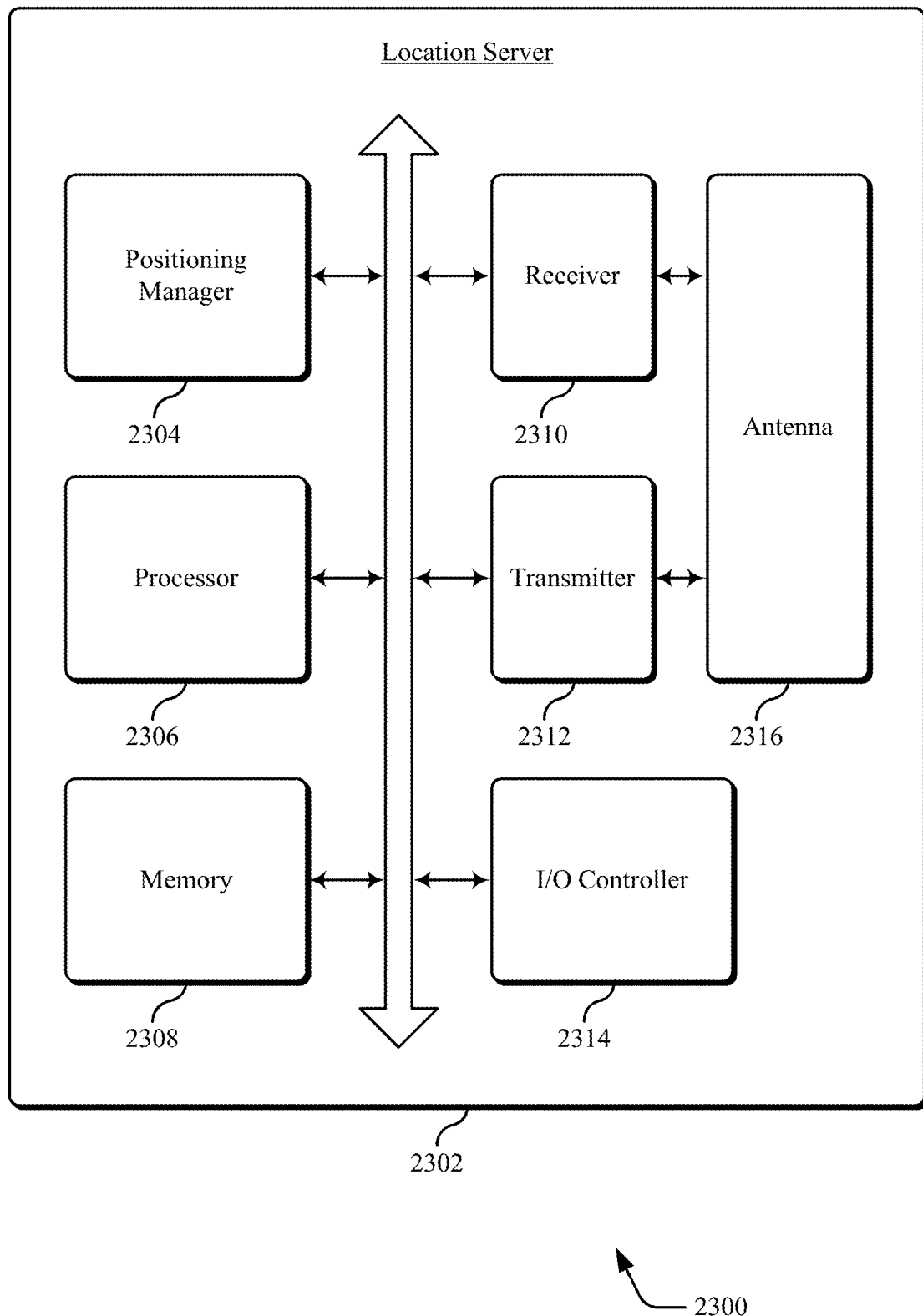
FIG. 23 illustrates an example block diagram of components of a base station that supports signal isolation using polarization in an NTN in accordance with aspects of the present disclosure.

FIG. 23 illustrates an example of a block diagram 2300 of a device 2302 that supports signal isolation using polarization in an NTN in accordance with aspects of the present disclosure. The device 2302 may be an example of a location server that implements the LMF, as described herein. The device 2302 may support wireless communication and/or network signaling with one or more base stations 102, UE 104, or any combination thereof. The device 2302 may include components for bi-directional communications including components for transmitting and receiving communications, such as a positioning manager 2304, a processor 2306, a memory 2308, a receiver 2310, a transmitter 2312, and an I/O controller 2314. These components may be in electronic communication or otherwise coupled (e.g., operatively, communicatively, functionally, electronically, electrically) via one or more interfaces (e.g., buses).

The positioning manager 2304, the receiver 2310, the transmitter 2312, or various combinations thereof or various components thereof may be examples of means for performing various aspects of the present disclosure as described herein. For example, the positioning manager 2304, the receiver 2310, the transmitter 2312, or various combinations or components thereof may support a method for performing one or more of the functions described herein.

In some implementations, the positioning manager 2304, the receiver 2310, the transmitter 2312, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2306 and the memory 2308 coupled with the processor 2306 may be configured to perform one or more of the functions described herein (e.g., by executing, by the processor 2306, instructions stored in the memory 2308).

Additionally or alternatively, in some implementations, the positioning manager 2304, the receiver 2310, the transmitter 2312, or various combinations or components thereof may be implemented in code (e.g., as communications management software or firmware) executed by the processor 2306. If implemented in code executed by the processor 2306, the functions of the positioning manager 2304, the receiver 2310, the transmitter 2312, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the positioning manager 2304 may be configured to perform various operations (e.g., receiving, monitoring, transmitting) using or otherwise in cooperation with the receiver 2310, the transmitter 2312, or both. For example, the positioning manager 2304 may receive information from the receiver 2310, send information to the transmitter 2312, or be integrated in combination with the receiver 2310, the transmitter 2312, or both to receive information, transmit information, or perform various other operations as described herein. Although the positioning manager 2304 is illustrated as a separate component, in some implementations, one or more functions described with reference to the positioning manager 2304 may be supported by or performed by the processor 2306, the memory 2308, or any combination thereof. For example, the memory 2308 may store code, which may include instructions executable by the processor 2306 to cause the device 2302 to perform various aspects of the present disclosure as described herein, or the processor 2306 and the memory 2308 may be otherwise configured to perform or support such operations.

For example, the positioning manager 2304 may support wireless communication at a device (e.g., the device 2302, an apparatus, location server) in accordance with examples as disclosed herein. The positioning manager 2304 and/or other device components may be configured as or otherwise support an apparatus, such as a location server, including a transmitter to: transmit a first configuration associated with a set of positioning reference signals, the first configuration indicating a time and frequency resource for a positioning reference signal of the set of positioning reference signals;

transmit a second configuration associating a positioning measurement of the positioning reference signal on the time and frequency resource; transmit one or more types of polarization associated with at least one of the first configuration or the second configuration; and a receiver to: receive a report indicating the one or more types of polarization associated with the positioning measurement of the positioning reference signal on the time and frequency resource.

Additionally, the apparatus (e.g., a location server) includes any one or combination of: the report indicates the one or more types of polarization on which the positioning measurement is performed. The one or more types of polarization include at least two types of polarization, and wherein the apparatus is configured to select at least one of the two types of polarization for the positioning measurement.

The positioning manager 2104 and/or other device components may be configured as or otherwise support a means for network signaling, wireless communication, and/or positioning tones isolation at a location server, including transmitting a first configuration associated with a set of positioning reference signals, the first configuration indicating a time and frequency resource for a positioning reference signal of the set of positioning reference signals; transmitting a second configuration associating a positioning measurement of the positioning reference signal on the time and frequency resource; transmitting one or more types of polarization associated with at least one of the first configuration or the second configuration; and receiving a report indicating the one or more types of polarization associated with the positioning measurement of the positioning reference signal on the time and frequency resource.

The processor 2306 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2306 may be configured to operate a memory array using a memory controller. In some other implementations, a memory controller may be integrated into the processor 2306. The processor 2306 may be configured to execute computer-readable instructions stored in a memory (e.g., the memory 2308) to cause the device 2302 to perform various functions of the present disclosure.

The memory 2308 may include random access memory (RAM) and read-only memory (ROM). The memory 2308 may store computer-readable, computer-executable code including instructions that, when executed by the processor 2306 cause the device 2302 to perform various functions described herein. The code may be stored in a non-transitory computer-readable medium such as system memory or another type of memory. In some implementations, the code may not be directly executable by the processor 2306 but may cause a computer (e.g., when compiled and executed) to perform functions described herein. In some implementations, the memory 2308 may include, among other things, a basic I/O system (BIOS) which may control basic hardware or software operation such as the interaction with peripheral components or devices.

The I/O controller 2314 may manage input and output signals for the device 2302. The I/O controller 2314 may also manage peripherals not integrated into the device 2302. In some implementations, the I/O controller 2314 may represent a physical connection or port to an external peripheral. In some implementations, the I/O controller 2314 may utilize an operating system such as iOS®, ANDROID®, MS-DOS®, MS-WINDOWS®, OS/2®, UNIX®, LINUX®, or another known operating system. In some implementations, the I/O controller 2314 may be implemented as part of a processor, such as the processor 2306. In some implementations, a user may interact with the device 2302 via the I/O controller 2314 or via hardware components controlled by the I/O controller 2314.

In some implementations, the device 2302 may include a single antenna 2316. However, in some other implementations, the device 2302 may have more than one antenna 2316, which may be capable of concurrently transmitting or receiving multiple wireless transmissions. The receiver 2310 and the transmitter 2312 may communicate bi-directionally, via the one or more antennas 2316, wired, or wireless links as described herein. For example, the receiver 2310 and the transmitter 2312 may represent a wireless transceiver and may communicate bi-directionally with another wireless transceiver. The transceiver may also include a modem to modulate the packets, to provide the modulated packets to one or more antennas 2316 for transmission, and to demodulate packets received from the one or more antennas 2316.

Figure 24:
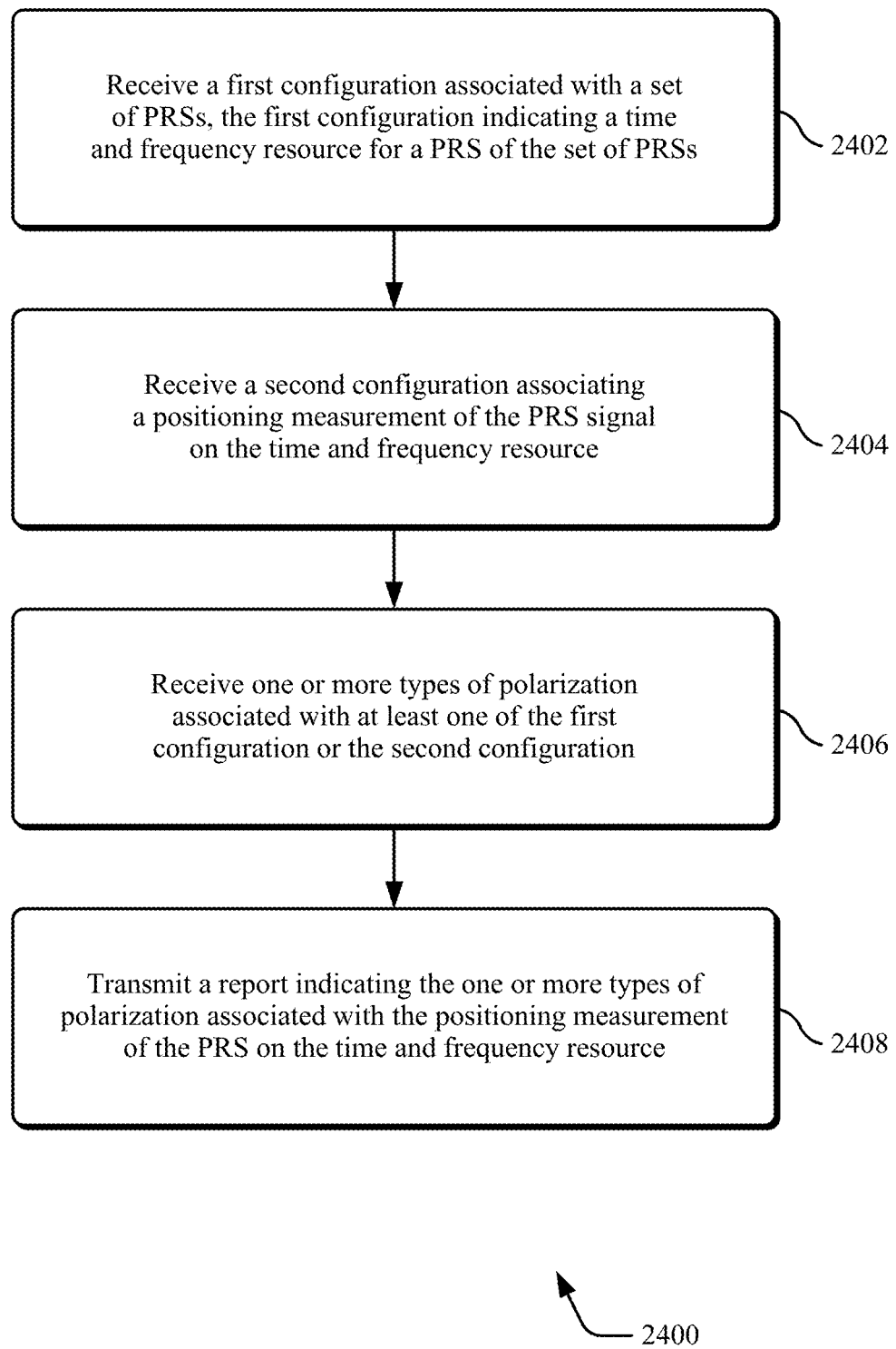
FIGS. 24 and 25 illustrate flowcharts of methods that support signal isolation using polarization in an NTN in accordance with aspects of the present disclosure.

FIG. 24 illustrates a flowchart of a method 2400 that supports signal isolation using polarization in an NTN in accordance with aspects of the present disclosure. The operations of the method 2400 may be implemented by a device or its components as described herein. For example, the operations of the method 2400 may be performed by a device, such as UE 104 as described with reference to FIGS. 1 through 23. In some implementations, the device may execute a set of instructions to control the function elements of the device to perform the described functions. Additionally, or alternatively, the device may perform aspects of the described functions using special-purpose hardware.

At 2402, the method may include receiving a first configuration associated with a set of PRSs, the first configuration indicating a time and frequency resource for a PRS of the set of PRSs. The operations of 2402 may be performed in accordance with examples as described herein. In some implementations, aspects of the operations of 2402 may be performed by a device as described with reference to FIG. 1.

At 2404, the method may include receiving a second configuration associating a positioning measurement of the PRS on the time and frequency resource. The operations of 2404 may be performed in accordance with examples as described herein. In some implementations, aspects of the operations of 2404 may be performed by a device as described with reference to FIG. 1.

At 2406, the method may include receiving one or more types of polarization associated with at least one of the first configuration or the second configuration. The operations of 2406 may be performed in accordance with examples as described herein. In some implementations, aspects of the operations of 2406 may be performed by a device as described with reference to FIG. 1.

At 2408, the method may include transmitting a report indicating the one or more types of polarization associated with the positioning measurement of the PRS on the time and frequency resource. The operations of 2408 may be performed in accordance with examples as described herein. In some implementations, aspects of the operations of 2408 may be performed by a device as described with reference to FIG. 1.

Figure 25:
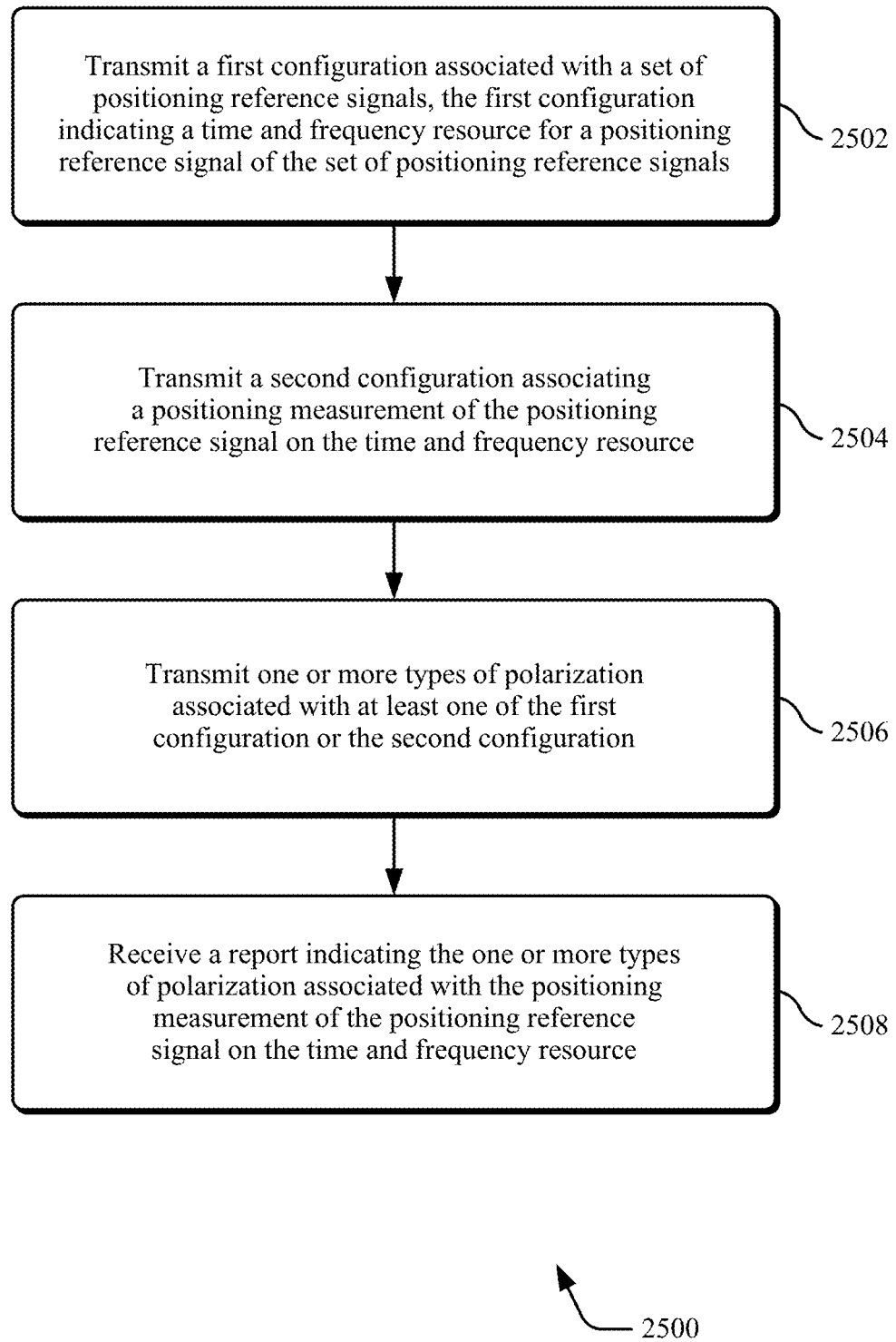

FIG. 25 illustrates a flowchart of a method 2500 that supports signal isolation using polarization in an NTN in accordance with aspects of the present disclosure. The operations of the method 2500 may be implemented by a device or its components as described herein. For example, the operations of the method 2500 may be performed by a location server that implements a LMF, as described with reference to FIGS. 1 through 23. In some implementations, the device may execute a set of instructions to control the function elements of the device to perform the described functions. Additionally, or alternatively, the device may perform aspects of the described functions using special-purpose hardware.

At 2502, the method may include transmitting a first configuration associated with a set of PRSs, the first configuration indicating a time and frequency resource for a PRS of the set of PRSs. The operations of 2502 may be performed in accordance with examples as described herein. In some implementations, aspects of the operations of 2502 may be performed by a device as described with reference to FIG. 1.

At 2504, the method may include transmitting a second configuration associating a positioning measurement of the PRS on the time and frequency resource. The operations of 2504 may be performed in accordance with examples as described herein. In some implementations, aspects of the operations of 2504 may be performed by a device as described with reference to FIG. 1.

At 2506, the method may include transmitting one or more types of polarization associated with at least one of the first configuration or the second configuration. The operations of 2506 may be performed in accordance with examples as described herein. In some implementations, aspects of the operations of 2506 may be performed by a device as described with reference to FIG. 1.

At 2508, the method may include receiving a report indicating the one or more types of polarization associated with the positioning measurement of the PRS on the time and frequency resource. The operations of 2508 may be performed in accordance with examples as described herein. In some implementations, aspects of the operations of 2508 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at" least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   at least one memory; and
   at least one processor coupled with the at least one memory and configured to cause the apparatus to:
   receive a first configuration associated with a set of positioning reference signals, the first configuration indicating a time and frequency resource for a positioning reference signal of the set of positioning reference signals;
   receive a second configuration indicating types of polarization associated with the set of positioning reference signals; and
   transmit a report indicating a positioning measurement of the positioning reference signal and indicating at least a type of polarization associated with the positioning measurement of the positioning reference signal, the type of polarization based on a positioning reference signal resource set including the time and frequency resource.

2. The apparatus of claim 1, wherein a set of positioning reference signal beams of a serving cell are associated with one type of polarization of the types of polarization.

3. The apparatus of claim 1, wherein the set of positioning reference signals are associated with one type of polarization of the types of polarization based on the set of positioning reference signals being associated with a transmission-reception point.

4. The apparatus of claim 1, wherein the positioning reference signal resource set is associated with one type of polarization of the types of polarization, and a set of positioning reference signal beams in the positioning reference signal resource set are associated with the one type of polarization.

5. The apparatus of claim 1, wherein each resource in the positioning reference signal resource set is associated with one type of polarization of the types of polarization, and positioning reference signal beams within the positioning reference signal resource set have different types of polarization.

6. The apparatus of claim 1, wherein an information element of the first configuration indicates at least one of a respective type of polarization for the positioning reference signal at a serving cell, a transmission-reception point, the positioning reference signal resource set, or a resource.

7. The apparatus of claim 1, wherein an information element of the first configuration indicates a quasi co-location as an association between the set of positioning reference signals and target reference signals in terms of a type of polarization.

8. The apparatus of claim 1, wherein the types of polarization include at least two types of polarization, and wherein the at least one processor is configured to select at least the type of polarization from the at least two types of polarization.

9. The apparatus of claim 1, wherein the at least one processor is configured to receive the set of positioning reference signals associated with one or more types of polarization of non-terrestrial network signal beams.

10. The apparatus of claim 9, wherein the at least one processor is configured to cause the apparatus to perform the positioning measurement by measuring the positioning reference signal, and the type of polarization is based on one or more types of polarization of a beam associated with the positioning measurement.

11. The apparatus of claim 1, wherein the type of polarization includes two types of polarization, and the report includes the positioning measurement for the two types of polarization.

12. An apparatus, comprising:
    at least one memory; and
    at least one processor coupled with the at least one memory and configured to cause the apparatus to:
    transmit a first configuration associated with a set of positioning reference signals, the first configuration indicating a time and frequency resource for a positioning reference signal of the set of positioning reference signals;
    transmit a second configuration indicating types of polarization associated with the set of positioning reference signals; and
    receive a report indicating a positioning measurement of the positioning reference signal and indicating at least a type of polarization associated with the positioning measurement of the positioning reference signal, the type of polarization based on a positioning reference signal resource set including the time and frequency resource.

13. The apparatus of claim 12, wherein the type of polarization includes one or more types of polarization of a beam associated with the positioning measurement.

14. The apparatus of claim 12, wherein the types of polarization include at least two types of polarization.

15. A method performed by a user equipment, the method comprising:
    receiving a first configuration associated with a set of positioning reference signals, the first configuration indicating a time and frequency resource for a positioning reference signal of the set of positioning reference signals;
    receiving a second configuration indicating types of polarization associated with the set of positioning reference signals; and
    transmitting a report indicating a positioning measurement of the positioning reference signal and indicating at least a type of polarization associated with the positioning measurement of the positioning reference signal, the type of polarization based on a positioning reference signal resource set including the time and frequency resource.

16. The method of claim 15, wherein a set of positioning reference signal beams of a serving cell are associated with one type of polarization of the types of polarization.

17. The method of claim 15, wherein the set of positioning reference signals are associated with one type of polarization of the types of polarization based on the set of positioning reference signals being associated with a transmission-reception point.

18. The method of claim 15, wherein the positioning reference signal resource set is associated with one type of polarization of the types of polarization, and a set of positioning reference signal beams in the positioning reference signal resource set are associated with the one type of polarization.

19. The method of claim 15, wherein each resource in the positioning reference signal resource set is associated with one type of polarization of the types of polarization, and positioning reference signal beams within the positioning reference signal resource set have different types of polarization.

20. The method of claim 15, wherein an information element of the first configuration indicates at least one of a respective type of polarization for the positioning reference signal at a serving cell, a transmission-reception point, the positioning reference signal resource set, or a resource.

* * * * *